United States Patent [19]

Nakahata et al.

[11] Patent Number: 5,387,646
[45] Date of Patent: Feb. 7, 1995

[54] FLUORINE-TYPE RESIN COMPOSITION, CURABLE COMPOSITION AND COATING COMPOSITION

[75] Inventors: Akimasa Nakahata, Hiratsuka; Nobushige Numa; Masahiro Yamane, both of Ebina; Osamu Isozaki, Yokohama; Noboru Nakai, Hiratsuka, all of Japan

[73] Assignee: Kansai Paint Company, Limited, Amagasaki, Japan

[21] Appl. No.: 43,984

[22] Filed: Apr. 7, 1993

Related U.S. Application Data

[63] Continuation of Ser. No. 486,667, Mar. 1, 1990, abandoned.

[30] Foreign Application Priority Data

Mar. 2, 1989 [JP] Japan .................. 1-50587

[51] Int. Cl.6 .................. C08L 27/14; C08L 83/00
[52] U.S. Cl. .................. 525/103; 525/104; 525/121; 525/199; 525/200; 525/208; 525/209
[58] Field of Search .................. 526/250, 273, 279; 525/104, 100, 121, 103, 199, 200, 208, 209; 528/27

[56] References Cited

U.S. PATENT DOCUMENTS

| | | | |
|---|---|---|---|
| 3,132,121 | 5/1964 | Pascal | 526/250 |
| 3,781,251 | 12/1973 | Hermes | 526/250 |
| 4,369,279 | 1/1983 | Emerick | 524/267 |
| 4,564,557 | 1/1986 | Ohgushi et al. | 428/333 |
| 4,614,766 | 9/1986 | Schimmel et al. | 525/104 |
| 4,657,986 | 4/1987 | Isayama et al. | 525/407 |
| 4,772,672 | 9/1988 | Isozaki et al. | 526/273 |
| 4,788,254 | 11/1988 | Kawakubo et al. | 525/100 |
| 4,886,862 | 12/1989 | Kuwamura et al. | 526/247 |
| 4,923,930 | 5/1990 | Iwasawa et al. | 525/168 |
| 4,960,827 | 10/1990 | Miyazaki et al. | 525/131 |
| 5,026,793 | 6/1991 | Nakai et al. | 525/476 |

*Primary Examiner*—Ralph H. Dean
*Attorney, Agent, or Firm*—Armstrong, Westerman, Hattori, McLeland & Naughton

[57] ABSTRACT

The invention provides:
1) a fluorine-containing resin composition including:
   a) a fluorine-containing resin having (i) a hydrolyzable group attached directly to a silicon atom and/or a silanol group and (ii) an epoxy group in the molecule, or
   b) a mixture of a component (I) having a hydrolyzable group attached directly to a silicon atom and/or a silanol group and a component (II) having an epoxy group, such that at least one of the components (I) and (II) is a fluorine-containing resin;
2) a curable composition including the resin composition and a metal chelate compound; and
3) a coating composition including this resin composition or this curable composition.

7 Claims, No Drawings

FLUORINE-TYPE RESIN COMPOSITION, CURABLE COMPOSITION AND COATING COMPOSITION

This application is a continuation of application Ser. No. 07/486,667 filed Mar. 1, 1990, now abandoned.

The present invention relates to a fluorine-type resin composition, a curable composition and a coating composition.

Conventional methods of curing resins include those comprising curing a hydroxyl-containing resin with a crosslinking agent such as a diisocyanate compound, melamine resin or the like. These methods, however, has drawbacks. Diisocyanates are toxic and give a coating unsatisfactory in weatherability and likely to yellow. Further the resin compositions have a short pot life. Use of melamine resins necessitates baking at high temperatures of about 140° C. or above and provides a coat poor in resistance to acids, scratching, staining and weather.

Low-temperature curable nontoxic one-package resin compositions are available. For example, Japanese Unexamined Patent Publication No.67553/1985 discloses a resin composition comprising an aluminum chelate compound and a vinyl polymer comprising as a monomer component alkoxysilane compound such as methacryloxypropyltrimethoxysilane.

Yet these conventional resin compositions are defective. Since the silanol group formed by the hydrolysis of alkoxy group attached to silicon atom is the sole crosslinking functional group, the composition requires a large quantity of water for curing. Consequently large amounts of by-products, such as alcohol, resulting from the-hydrolysis give impaired properties to the cured product. Further when the composition is cured in the presence of only the moisture in air, the composition initially becomes cured at the surface, with its interior generally remaining incompletely cured, so that the curing is likely to result in a shrunk product having a deteriorated fatness.

It is an object of the present invention to provide a resin composition usable in combination with a metal chelate compound to give a curable composition highly stable even in a one-package form and useful as, e.g., a coating composition.

It is another object of the invention to provide a curable composition and a coating composition which are excellent in low temperature curability and which give a coat outstanding in resistance to weather, acids, scratching and staining, mechanical properties and the like.

Other objects and features of the invention will become apparent from the following description.

We conducted extensive research to achieve the above objects, and found that a resin composition comprising a fluorine-containing resin containing (i) hydrolyzable group attached directly to a silicon atom and/or a silanol group (both groups may be hereinafter referred to as a "silane group" in the specification and claims) and (ii) an epoxy group, or comprising a mixture of a silane-containing component and an epoxy-containing component, can be used in combination with a metal chelate compound to provide a curable composition excellent in storage stability even in a one-package form. Our further discovery is that such curable composition is substantially free of toxicity problems and can be cured at a high rate even at a low temperature to give a coat excellent in resistance to weather, acids, scratching and staining and the like. The present invention has been accomplished on the basis of these novel findings.

According to the present invention, there are provided:

1) a fluorine-containing resin composition comprising:
   a) a fluorine-containing resin additionally containing (i) a hydrolyzable group attached directly to a silicon atom and/or a silanol group, and (ii) and epoxy group in the molecule, or
   b) a mixture of a component (I) having a hydrolyzable group attached directly to a silicon atom and/or a silanol group and a component (II) having an epoxy group, wherein at least one of the components (I) and (II) is a fluorine-containing resin;
2) a curable composition comprising the above-fluorine-containing resin composition and a metal chelate compound as a curing catalyst; and
3) a coating composition comprising as an essential component one of the above resin compositions and the above curable composition.

The term "hydrolyzable group" used herein refers to a group which is attached to a silicon atom and which hydrolyzes in the presence of water or moisture, giving a silanol group. Examples of such hydrolyzable groups include those represented by the formulas

In the foregoing formulas, R' is an alkyl having 1 to 4 Carbon atoms, R", R''' and R'''' are the same or different and each represent an alkyl group having 1 to 8 carbon atoms, an aryl group and an aralkyl group.

Examples of the $C_{1-8}$ alkyl group in the formulas are methyl, ethyl, n-propyl, isopropyl, n-butyl, iso-butyl, sec-butyl, tert-butyl, n-pentyl, isopentyl, n-octyl, iso-octyl, etc. Examples of the aryl group are phenyl, tolyl, xylyl, etc. Examples of the aralkyl group are benzyl, phenethyl, etc.

Examples of the hydrolyzable group directly attached to silicon atom may be a group →Si—H group.

It is suitable that the silane groups in the resin composition of the invention be hydrolyzable groups of the formulas (I) and (II) attached to a silicon atom and/or a silanol group in view of high storage stability, curability and the like.

Examples of the fluorine-containing resin compositions of the present invention are given below in (a) to (d):

(a) a resin composition comprising a fluorine-containing resin which also having has a silane group and an epoxy group in the molecule, (b) a resin composition comprising a mixture of a fluorine-containing resin having a silane group and a fluorine-containing resin having an epoxy group, (c) a resin composition comprising a mixture of a fluorine-containing resin having a silane group and a resin (or a compound) having an epoxy group, and (d) a resin composition comprising a mixture of a fluorine-containing resin having an epoxy group and a resin (or a compound) having a silane group.

The fluorine-containing resin composition comprises any one of, for example, the following essential components (1) to (10).

(1) A reaction product (D) prepared by reacting a fluorine-containing resin (A) having a functional group, a compound (B) having an epoxy group and a functional group complementarily reactive with the functional group of the compound (A), and a compound (C) having a silane group and a functional group complementarily reactive with the functional group of the compound (A) (hereinafter referred to as "essential component (1)").

(2) A mixture (I) of a product (F) and a product (H), the product (F) being a reaction product of a resin (E) having a functional group and the compound (B) having a epoxy group and a functional group complementarily reactive with the functional group of the resin (E), and the product (H) being a reaction product of a resin (G) having a functional group and the compound (C) having a silane group and functional group complementarily reactive with the functional group of the resin (G), the product (F) and/or the product (H) being a fluorine-containing resin (hereinafter referred to as "essential component (2)").

(3) A copolymer (L) comprising, as a monomer component, an epoxy-containing polymerizable unsaturated monomer (J), a silane-containing polymerizable unsaturated monomer (K), a fluorine-containing polymerizable unsaturated monomer (b) and, when required, another polymerizable unsaturated monomer (M) (hereinafter referred to as "essential component (3)").

(4) A mixture of a polymer (N) and a polymer (P), the polymer (N) being a homopolymer of the monomer (J) or a copolymer of the monomer (J) and another polymerizable unsaturated monomer (M), and the polymer (P) being a homopolymer of the monomer (K) or a copolymer of the monomer (K) and the polymerizable unsaturated monomer (M), the polymer (N) and/or the polymer (P) being a fluorine-containing polymer (hereinafter referred to as "essential component (4)").

(5) A reaction product (T) of a copolymer (R) with a compound (S), the copolymer (R) being one comprising, as a monomer component, a polymerizable unsaturated monomer (Q) having a functional group, the epoxy-containing polymerizable unsaturated monomer (J) and the fluorine-containing polymerizable unsaturated monomer (b), and the compound (S) being one having a silane group and a functional group complementarily reactive with the functional group derived from the monomer (Q) (hereinafter referred to as "essential component (5)").

(6) A reaction product (X) of a copolymer (V) with a compound (W), the copolymer (V) being one comprising as a monomer component, a polymerizable unsaturated monomer (U) having functional group, the silane-containing polymerizable unsaturated monomer (K) and the fluorine-containing polymerizable unsaturated monomer (b), and the compound (W) being one having epoxy group and functional group complementarily reactive with the functional group derived from the monomer (U) (hereinafter referred to as "essential component (6)").

(7) A mixture (Y) of the polymer (N) and the reaction product (H), the polymer (N) and/or the reaction product (H) containing fluorine (hereinafter referred to as "essential component (7)").

(8) A mixture (Z) of the polymer (P) and the reaction product (F), the polymer (P) and/or the reaction product (F) containing fluorine (hereinafter referred to as "essential component (8)").

(9) A mixture of a silane-containing and fluorine-containing resin (fluorine-containing reaction product (H), fluorine-containing polymer (P), etc.) with a compound having 2 or more epoxy groups on the average per molecule (hereinafter referred to as "essential component (9)").

(10) A mixture of an epoxy-containing and fluorine-containing resin (fluorine-containing reaction product (F), fluorine-containing polymer (N), etc.) with a compound having at least 2 silane groups on the average per molecule (hereinafter referred to as "essential component (10)").

Among the essential components (1) to (8), the essential components (1), (3), (5) and (6) are those having silane and epoxy groups contained in the same resin, whereas the other essential components comprise a mixture of the silane-containing resin (or compound) and the epoxy-containing resin (or compound).

The term "functional group complementarily reactive with the functional group" used in respect of the essential components (1) to (8) means the functional groups reactive with each other. Suitable groups are selectable for example from those listed below.

TABLE

| Resin and Monomer | | Compound | |
|---|---|---|---|
| Kind | Functional Group | Kind | Functional Group |
| Resin (A) | Hydroxyl group (1) | Compound (B) | Hydroxyl group (1) |
| | Carboxyl group (2) | | Silane group (3) |
| | Silane group (3) | | Epoxy group (4) |
| | Isocyanato group (5) | | Isocyanato group (5) |
| | | | Unsaturated group (8) |
| | Hydroxyl group (1) | Compound (C) | Hydroxyl group (1) |
| | Carboxyl group (2) | | Carboxyl group (2) |

TABLE-continued

| Resin and Monomer | | Compound | |
|---|---|---|---|
| Kind | Functional Group | Kind | Functional Group |
| | Silane group (3) | | Silane group (3) |
| | Epoxy group (4) | | Epoxy group (4) |
| | Isocyanato group (5) | | Isocyanato group (5) |
| | Mercapto group (6) | | Mercapto group (6) |
| | Amino group (NH,NH$_2$) (7) | | Amino group (NH,NH$_2$) (7) |
| | | | Unsaturated group (8) |
| Resin (E) | Same groups as Resin (A) | Compound (B) | Same as above |
| Resin (G) | Same groups as Resin (A) | Compound (C) | Same as above |
| Monomer (Q) | Hydroxyl group (1) | Compound (S) | Hydroxyl group (1) |
| | Epoxy group (4) | | Carboxyl group (2) |
| | Isocyanato group (5) | | Silane group (3) |
| | | | Isocyanato group (5) |
| | | | Mercapto group (6) |
| | | | Amino group(NH,NH$_2$) (7) |
| Monomer (U) | Hydroxyl group (1) | Compound (W) | Hydroxyl group (1) |
| | Carboxyl group (2) | | Silane group (3) |
| | Silane group (3) | | Epoxy group (4) |
| | Isocyanato group (5) | | Isocyanato group (5) |
| | Amino group (NH,NH$_2$) (7) | | Unsaturated group (8) |

The functional groups complementarily reactive with each other can be suitably selected from the above list to provide a combination. Suitable combinations are given below.

(i) Combinations of functional groups of resin (A)/compound (B) (or resin (E)/compound (B))
(1)/(5), (2)/(4), (3)/(3), (5)/(1), etc.

(ii) Combinations of functional groups of resin (A)/compound (C) (or resin (G)/compound (C))
(1)/(5), (2)/(3), (2)/(4), (2)/(5), (3)/(3), (4)/(2), (4)/(6), (4)/(7), (5)/(1), (5)/(2), (5)/(6), (5)/(7), (6)/(4), (6)/(8), (7)/(4), (7)/(5), (7)/(8), etc.

(iii) Combinations of functional groups of monomer (Q)/compound (S)
(1)/(5), (4)/(2), (4)/(6), (4)/(7), (5)/(1), (5)/(2), (5)/(3), (5)/(6), (5)/(7), etc.

(iv) Combinations of functional groups of monomer (U)/compound (W)
(1)/(5), (2)/(4), (2)/(5), (3)/(1), (5)/(1), (6)/(4), (6)/(5), (6)/(8), (7)/(4), (7)/(5), (7)/(8), etc.

The essential components (1) to (10) will be described below in detail.

Essential component (1)

Fluorine-containing resin (A)

The resin (A) can be suitably selected without specific limitation for example from conventional fluorine-containing resins having the foregoing functional groups.

The resin (A) has at least one functional group reactive with the functional group of the compound (B) and at least one functional group reactive with the functional group of the compound (C) on the average per molecule. The functional groups in the resin (A) may be the same or different.

When the resin (A) has the same functional groups, for example the resin (A) containing at least two hydroxyl groups on the average can be reacted with the compound (B) containing the isocyanato group (5) and the compound (C) containing the isocyanato group (5), or the resin (A) containing at least two isocyanato groups on the average can be reacted with the compound (B) containing the hydroxyl group (1) and the compound (C) containing the hydroxyl group (1).

When the resin (A) has different functional groups, for example the resin (A) containing at least one hydroxyl group (1) and at least one carboxyl group (2) on the average can be reacted with the compound (C) containing the isocyanato group (5) and the compound (B) containing the epoxy group (4).

The functional group of the compound (B) to be reacted with the functional group of the resin (A) may be epoxy. And the functional group of the compound (C) to be reacted with the functional group of the compound (A) may be silane.

Described below are the resins (A) containing hydroxyl, carboxyl, isocyanato, silane, epoxy or the like.

Hydroxyl-containing resin

Typical examples of such resin include a copolymer comprising as a monomer component a hydroxyl-containing polymerizable unsaturated monomer (a), a fluorine-containing polymerizable unsaturated monomer (b) and when required another polymerizable unsaturated monomer (c).

Hydroxyl-containing polymerizable unsaturated monomer (a)

The monomer (a) contains radically polymerizable unsaturated group and hydroxyl group in the molecule.

Typical of such monomer are the compounds represented by the formulas (1) to (4)

(1)

wherein R$^1$ is a hydrogen atom or a hydroxyalkyl group;

(2)

wherein R$^1$ is as defined above;

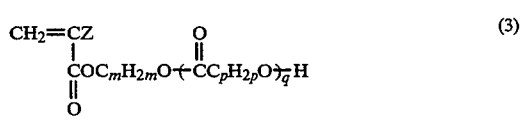

(3)

wherein Z is a hydrogen atom or a methyl group, m is an integer of 2 to 8, P is an integer of 2 to 18, and q is an integer of 0 to 7;

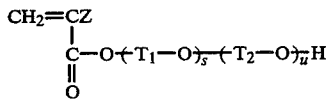
(4)

wherein Z is as defined above, $T_1$ and $T_2$ are the same or different and each represent a $C_{1-20}$ bivalent hydrocarbon group, and S and U are each an integer of 0 to 10 provided that the sum of S and U is 1 to 10.

The hydroxyalkyl group in the formulas (1) and (2) has 1 to 6 carbon atoms. Specific examples are —$C_2H_4OH$, —$C_3H_6OH$, —$C_4H_8OH$, etc.

Examples of the $C_{1-20}$ bivalent hydrocarbon group in the formula (4) are given below

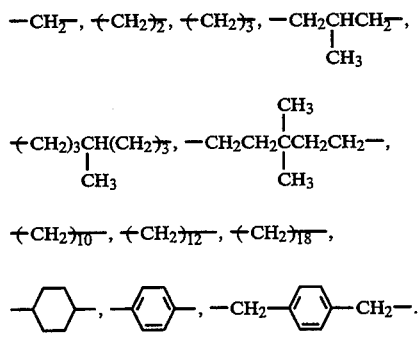

Examples of the monomer component of the formula (1) are $CH_2$=CHOH, $CH_2$=CHO$C_4H_8$OH, etc.

Examples of the monomer component of the formula (2) include those represented by the formulas

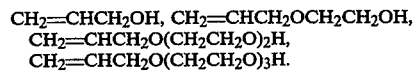

Examples of the monomer component of the formula (3) include those represented by the formulas

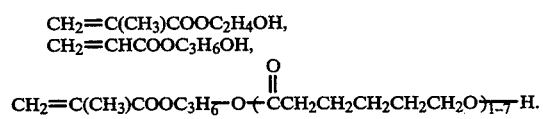

Examples of the monomer component of the formula (4) include those represented by the formulas

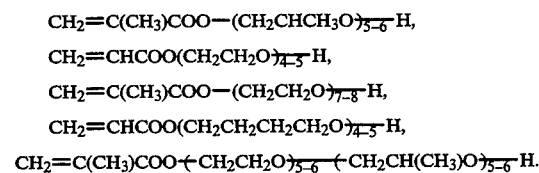

Also usable as the monomer (a) is an adduct of any of hydroxyl-containing unsaturated monomers of the formulas (1) to (4) with ε-caprolactone, γ-valerolactone or like lactone.

Fluorine-containing polymerizable unsaturated monomer (b)

The monomer (b) contains radically polymerizable unsaturated group and fluorine atom in the molecule. Typical of the monomer (b) are the compounds of the formulas (5) and (6)

(5)

wherein the groups X are the same or different and each represent a hydrogen atom, a chlorine atom, a bromine atom, a fluorine atom, an alkyl group or a haloalkyl group, provided that the compound contains at least one fluorine atom;

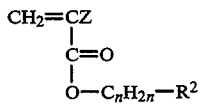
(6)

wherein Z is as defined above, $R^2$ is a fluoroalkyl group and n is an integer of 1 to 10.

The alkyl group in the formula (5) has 1 to 6 carbon atoms, preferably 1 to 4 carbon atoms. Specific examples are methyl, ethyl, propyl, isopropyl, butyl, pentyl, etc. The haloalkyl group in the formula (5) has 1 to 6 carbon atoms, preferably 1 to 4 carbon atoms. Specific examples are
$CHF_2$, $CH_2F$, $CCl_3$, $CH.Cl_2$, $CH_2Cl$, $CH_2Cl$, $CFCl_2$, $(CF_2)_2CF_3$, $(CF_2)_3CF_3$, $CF_2CH_3$, $CF_2CHF_2$, $CF_2Br$, $CH_2Br$, $CF_3$.

Examples of the monomer of the formula (5) include the compounds represented by the formulas
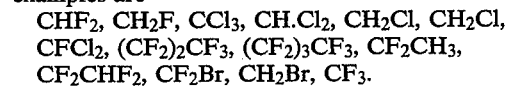
$CF_2$=$CF_2$, $CHF$=$CF_2$, $CH_2$=$CF_2$, $CH_2$=$CHF$, $CClF$=$CF_2$, $CHCl$=$CF_2$, $CCl_2$=$CF_2$, $CClF$=$CClF$,
$CHF$=$CCl_2$, $CH_2$=$CClF$, $CCl_2$=$CClF$,
$CF_3CF$=$CF_2$, $CF_3CF$=$CHF$, $CF_3CH$=$CF_2$,
$CF_3CF$=$CH_2$, $CH_3CF$=$CF_2$, $CHF_2CF$=$CHF$,
$CH_3CF$=$CH_2$, $CF_2ClCF$=$CF_2$, $CF_3CCl$=$CF_2$,
$CF_3CF$=$CFCl$, $CF_2ClCCl$=$CF_2$,
$CF_2ClCF$=$CFCl$,
$CFCl_2CF$=$CF_2$, $CF_2CCl$=$CClF$, $CF_3CCl$=$CCl_2$,
$CClF_2CF$=$CCl_2$, $CCl_3CF$=$CF_2$, $CF_2ClCCl$=$CCl_2$,
$CFCl_2$,$CCl$=$CCl_2$, $CF_3CF$=$CHCl$,
$CClF_2CF$=$CHCl$,
$CF_3CCl$=$CHCl$, $CHF_2CCl$=$CCl_2$,
$CF_2ClCH$=$CCl_2$,
$CF_2ClCCl$=$CHCl$, $CCl_3CF$=$CHCl$,
$CF_2ICF$=$CF_2$,
$CF_2BrCH$=$CF_2$, $CF_3CBr$=$CHBr$,
$CF_2ClCBr$=$CH_2$,
$CH_2BrCF$=$CCl_2$, $CF_3CBr$=$CH_2$, $CF_2CH$=$CHBr$,
$CF_2BrCH$=$CHF$, $CF_2BrCF$=$CF_2$,
$CF_3CF_2CF$=$CF_2$,
$CF_3CF$=$CFCF_3$, $CF_3CH$=$CFCF_3$,
$CF_2$=$CFCF_2CHF_2$,
$CF_3CF_2CF$=$CH_2$, $CF_3CH$=$CHCF_3$,
$CF_2$=$CFCH_2CH_3$,
$CF_2$=$CFCH_2CH_3$, $CF_3CH_2CH$=$CH_2$,
$CF_3CH$=$CHCH_3$,
$CF_2$=$CHCH_2CH_3$, $CH_3CF_2CH$=$CH_2$,
$CFH_2CH$=$CHCFH_2$,
$CH_3CF_2CH$=$CH_3$, $CH_2$=$CHCH_2CH_3$,
$CF_3(CF_2)_2CF$=$CF_2$, $CF_3(CF_2)_3CF$=$CF_2$.

The fluoroalkyl group in the formula (6) has 3 to 21 carbon atoms. Specific examples are $C_4F_9$, $(CF_2)_6CF(CF_3)_2$, $C_8F_{17}$, $C_{10}F_{21}$, etc.

Examples of the monomer of the formula (6) include the compounds represented by the formulas

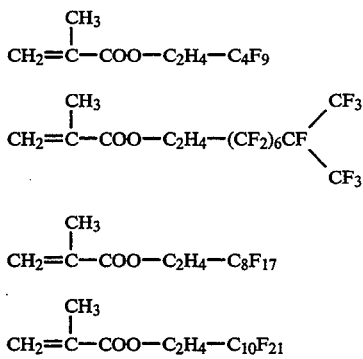

These monomers are usable singly or at least two of them can be used in mixture.

Use of the monomer of the formula (1) gives a coat outstanding in resistance to acids and weather, and use of the monomer of the formula (2) forms a coat excellent in water repellency.

Polymerizable unsaturated monomer (c)

The monomer (c) can be a conventional monomer having radically polymerizable unsaturated group and suitably selected according to the required properties.

Typical of such monomer are those shown below as (c-1) to (c-6).

(c-1) Olefin-type compounds such as ethylene, propylene, butylene, isoprene, chloroprene, etc.;

(c-2) Vinyl ethers and allyl ethers such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether, 4-methyl-1-pentyl vinyl ether and like chain-like alkyl vinyl ethers, cyclopentyl vinyl ether, cyclohexyl vinyl ether and like cycloalkyl vinyl ethers, phenyl vinyl ether, o-, m- or p-tolyl vinyl ether and like aryl vinyl ethers, benzyl vinyl ether, phenethyl vinyl ether and like aralkyl vinyl ethers, etc.;

(c-3) Vinyl esters and propenyl esters such as vinyl acetate, vinyl lactate, vinyl butyrate, vinyl isobutyrate, vinyl caproate, vinyl isocaproate, vinyl pivalate, vinyl caprate and like vinyl esters, isopropenyl acetate, isopropenyl propionate and like propenyl esters, etc.;

(c-4) Esters of acrylic or methacrylic acids such as $C_1$–$C_{18}$ alkyl esters of acrylic or methacrylic acids including methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate, $C_2$–$C_{18}$ alkoxyalkyl esters of acrylic or methacrylic acids including methoxybutyl acrylate, methoxybutyl methacrylate, methoxyethyl acrylate, methoxyethyl methacrylate, ethoxybutyl acrylate and ethoxybutyl methacrylate, etc.;

(c-5) Vinyl aromatic compounds such as styrene, α-methyl styrene, vinyltoluene, p-chlorostyrene, etc., and (c-6) acrylonitrile, methacrylonitrile, etc.

Carboxyl-containing resin

Typical examples of such resin include a copolymer comprising as a monomer component a carboxyl-containing polymerizable unsaturated monomer (d), the fluorine-containing polymerizable unsaturated monomer (b) and when required the polymerizable unsaturated monomer (c).

Carboxyl-containing polymerizable unsaturated monomer (d)

The monomer (d) contains radically polymerizable unsaturated group and carboxyl group in the molecule.

Typical of the monomer (d) are the compounds represented by the formulas (7) and (8)

wherein $R^3$ is a hydrogen atom or a lower alkyl group, $R^4$ is a hydrogen atom, a lower alkyl group or a carboxyl group, and $R^5$ is a hydrogen atom, a lower alkyl group or a carboxy-lower alkyl group;

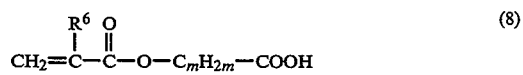

wherein $R^6$ is a hydrogen atom or a methyl group, and m is as defined above.

Preferred lower alkyl groups in the formula (7) are those having 1 to 4 carbon atoms, especially methyl.

Examples of the monomer of the formula (7) are acrylic acid, methacrylic acid, crotonic acid, itaconic acid, maleic acid, maleic anhydride, fumaric acid, etc.

Examples of the monomer of the formula (8) are 2-carboxyethyl acrylate or methacrylate, 2-carboxypropyl acrylate or methacrylate, 5-carboxypentyl acrylate or methacrylate, etc.

Also usable as the monomer (d) is an adduct of 1 mole of hydroxyl-containing polymerizable unsaturated monomer (a) with 1 mole of a polycarboxylic anhydride compound such as maleic anhydride, itaconic anhydride, succinic anhydride, phthalic anhydride or the like.

Carboxyl- and hydroxyl-containing resin

Typical examples of such resin include a copolymer comprising as a monomer component the hydroxyl-containing polymerizable unsaturated monomer (a), the carboxyl-containing polymerizable unsaturated monomer (d), the fluorine-containing polymerizable unsaturated monomer (b) and when required the polymerizable unsaturated monomer (c).

Isocyanato-containing resin

Typical examples of such resin include a copolymer comprising as a monomer component an isocyanato-containing polymerizable unsaturated monomer (e), the fluorine-containing polymerizable unsaturated monomer (b) and when required the polymerizable unsaturated monomer (c).

Isocyanato-containing polymerizable unsaturated monomer (e)

The monomer (e) contains radically polymerizable unsaturated group and isocyanato group in the molecule.

Typical examples of the monomer (e) are those represented by the formulas (9) and (10)

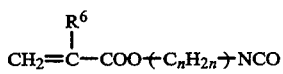
(9)

wherein $R^6$ and n are as defined above, examples of the monomer of the formula (9) being isocyanato ethyl acrylate or methacrylate; and

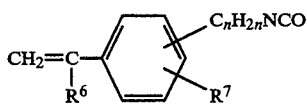
(10)

wherein $R^6$ and n are as defined above and $R^7$ is a hydrogen atom or an alkyl group having 1 to 5 carbon atoms, examples of the monomer of the formula (10) being α,α-dimethyl-m-isopropenyl benzyl isocyanate.

Also usable as the monomer (e) is a reaction product of 1 mole of the hydroxyl-containing polymerizable unsaturated monomer (b) and 1 mole of a polyisocyanate compound. Examples of useful polyisocyanate compounds are tolylene diisocyanate, 1,6-hexamethylene diisocyanate, 4,4'-diphenylmethane diisocyanate, 4,4'-diphenyl ether diisocyanate, phenylene diisocyanate, naphthalene diisocyanate, biphenylene diisocyanate, 3,3'-dimethyl-4,4'-biphenylene diisocyanate, dicyclohexylmethane-4,4'-diisocyanate, p-xylylene diisocyanate, m-xylylene diisocyanate, bis(4-isocyanatophenyl)sulfone, isopropylidenebis(4-phenylisocyanate), lysine isocyanate and isophorone diisocyanate, polymers thereof, biurets thereof, etc.

Also usable as the isocyanato-containing resin is a reaction product prepared by reacting a hydroxyl-containing resin with, e.g., the polyisocyanate compound.

Silane-containing resin

Typical examples of such resin are a resin prepared by reacting the hydroxyl-containing resin with an isocyanato-containing silane compound to be described later, a resin prepared by reacting the isocyanato-containing resin with a hydroxyl-containing silane compound to be described later, and a polymer prepared by polymerizing a silane-containing polymerizable unsaturated monomer (k) to be described later with when required the polymerizable unsaturated monomer (c).

Epoxy-containing resin

Typical examples of such resin are a resin prepared by reacting the hydroxyl-containing resin with an isocyanato-containing epoxy compound to be described later and a copolymer prepared by copolymerizing an epoxy-containing polymerizable unsaturated monomer (J) to be described later, the fluorine-containing polymerizable unsaturated monomer (b) and when required the polymerizable unsaturated monomer (c).

Compound (B)

The compound (B) useful for the essential component (1) has at least one epoxy group and at least one functional group reactive with the functional group of the resin (A) in the molecule. The functional group reactive with the functional group of the resin (A) may be epoxy. When the functional group is epoxy, the compound contains at least two epoxy groups in the molecule.

Described below are typical compounds corresponding to the compound (B).

Hydroxyl-containing epoxy compound

Examples of such compound include the compounds represented by the formulas (11) to (21)

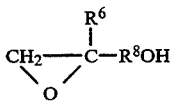
(11)

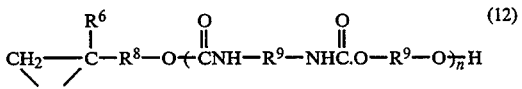
(12)

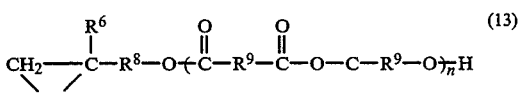
(13)

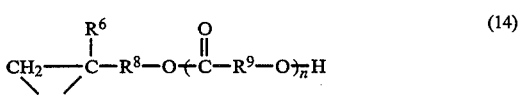
(14)

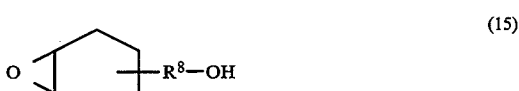
(15)

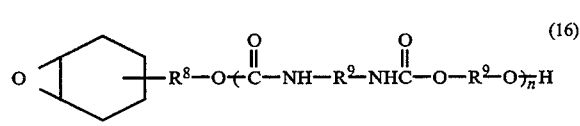
(16)

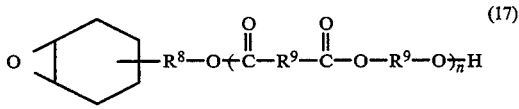
(17)

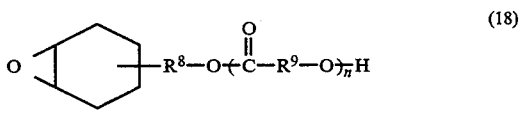
(18)

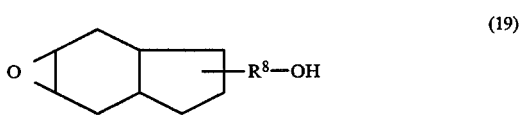
(19)

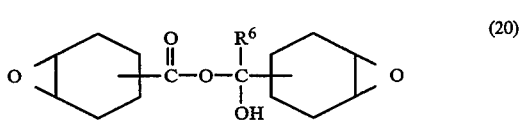
(20)

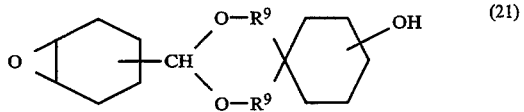
(21)

In the foregoing formulas, $R^6$ and n are as defined above, $R^8$ is a $C_{1-8}$ bivalent hydrocarbon group and the groups $R^9$ are the same or different and each represent a $C_{1-20}$ bivalent hydrocarbon group.

In the formulas (11) to (21), the $C_{1-8}$ bivalent hydrocarbon group can be suitably selected from the foregoing $C_{1-20}$ bivalent hydrocarbon groups, and the $C_{1-20}$ bivalent hydrocarbon groups include the above examples of such group.

Specific examples of the compounds of the formulas (11) to (21) are those represented by the formulas

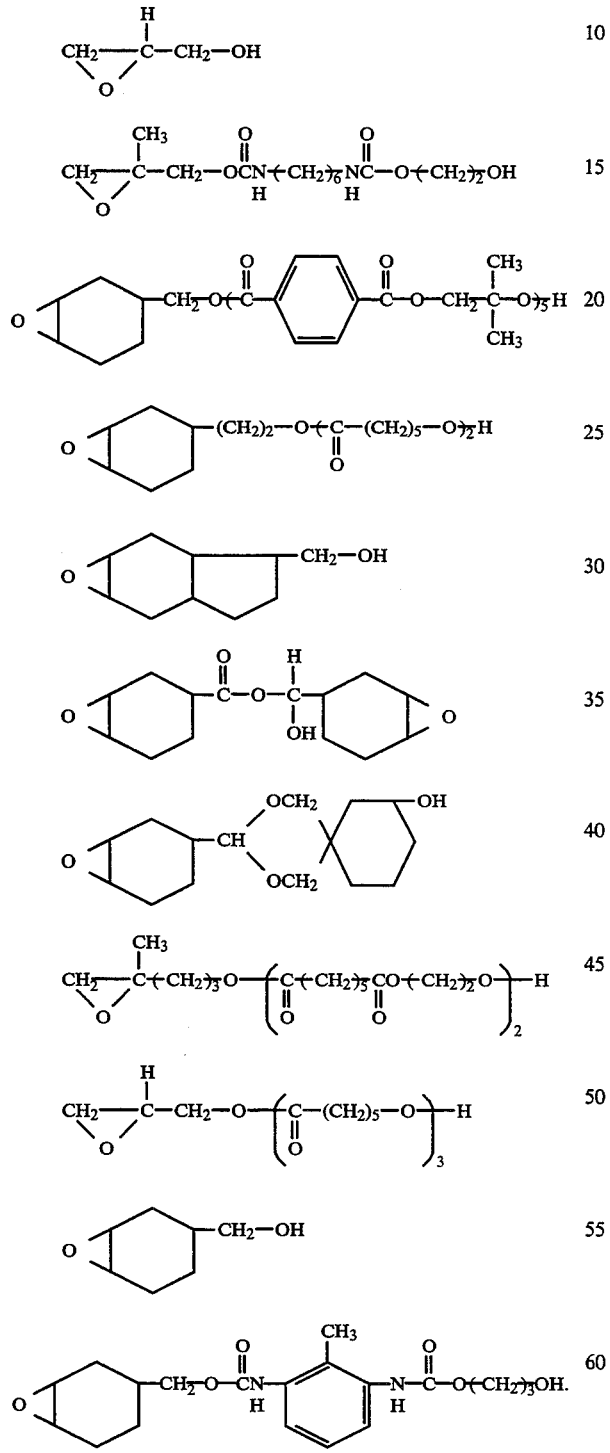

Silane-containing epoxy compound

Examples of such compound include the compounds represented by the formulas (22) to (25)

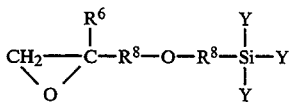

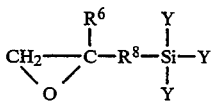

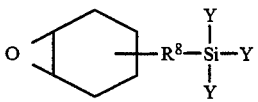

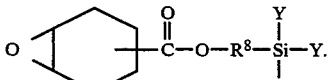

In the foregoing formulas, $R^6$ and $R^8$ have the same meaning as above and the groups $R^8$ are the same or different, the Y groups are the same or different and each represent a hydrogen atom, a hydroxyl group, a hydrolyzable group, a $C_{1-8}$ alkyl group, an aryl group or an aralkyl group provided that at least one of the Y groups is a hydrogen atom, a hydroxyl group or a hydrolyzable group.

Examples of hydrolyzable groups in the formulas (22) to (25) include those of the formulas (I) to (VI). The examples of the $C_{1-8}$ alkyl group, aryl group and aralkyl group in the formulas (22) to (25) include the above examples of these groups.

Specific examples of the compounds of the formulas (22) to (25) are those represented by the formulas

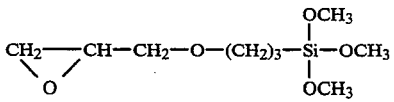

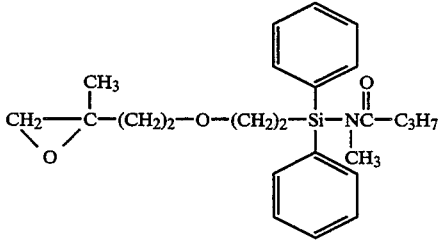

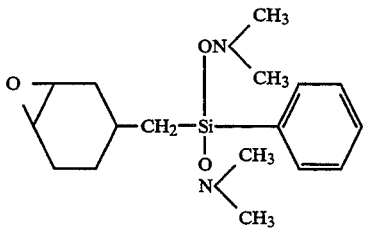

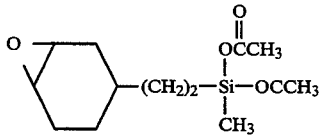

-continued

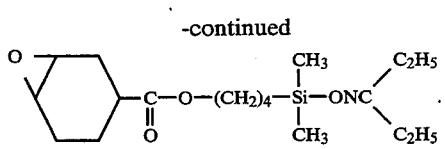

Polyepoxy compound

Examples of such compound include the compounds represented by the formulas (26) to (33)

In the foregoing formulas, $R^6$ and $R^8$ are as defined above; the groups $R^6$ are the same or different; the groups $R^8$ are the same or different; the $R^{10}$ groups are the same or different and are each a $C_{1-8}$ alkyl group, an aryl group or an aralkyl group; the groups $R^{11}$ are the same or different and are each a hydrogen atom or a $C_{1-4}$ alkyl group; and w is an integer of 0 to 10.

Examples of the compounds of the formulas (26) to (33) are those represented by the formulas

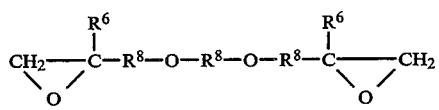 (26)

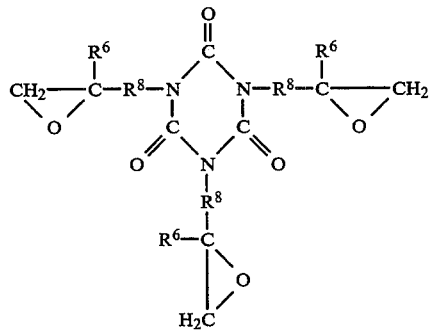 (27)

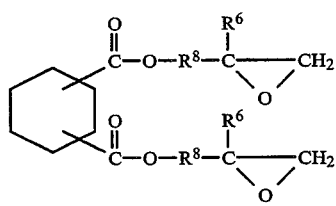 (28)

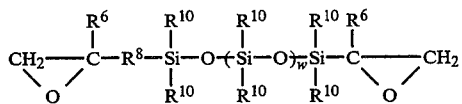 (29)

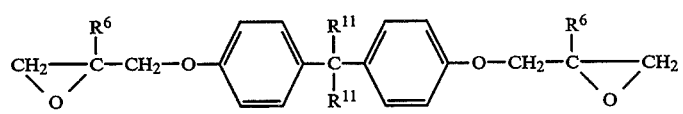 (30)

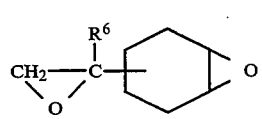 (31)

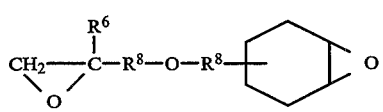 (32)

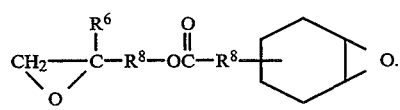 (33)

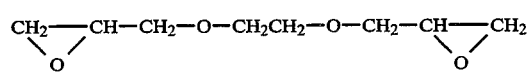

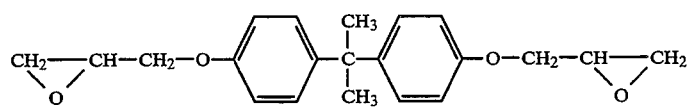

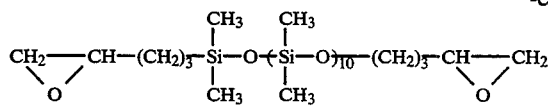

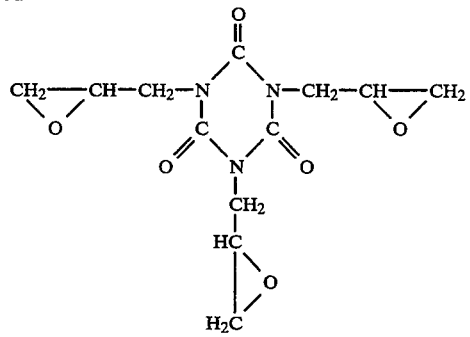

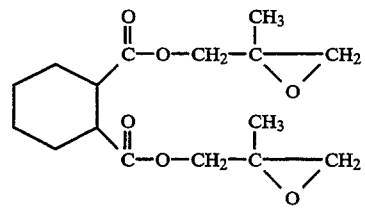

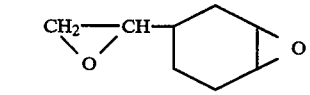

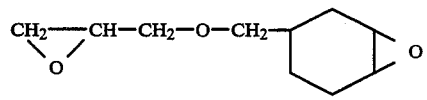

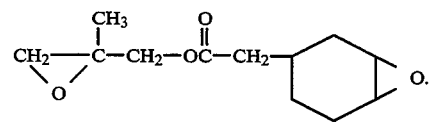

Further examples of the polyepoxy compound include those represented by the formulas

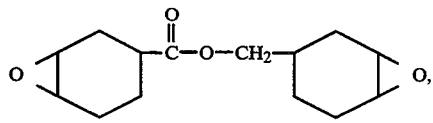

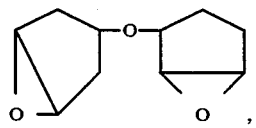

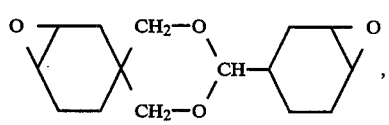

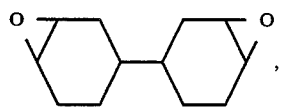

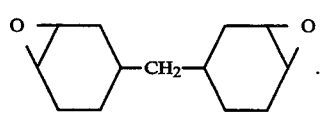

Also usable as the polyepoxy compound is an adduct of

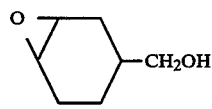

with a polyisocyanate compound. Examples of useful polyisocyanate compounds are organic diisocyanates such as hexamethylene diisocyanate, trimethyl hexamethylene diisocyanate and like aliphatic diisocyanates; hydrogenated xylylene diisocyanate, isophorone diisocyanate and like cyclic aliphatic diisocyanates; tolylene diisocyanate, 4,4'-diphenylmethane diisocyanate and like aromatic diisocyanates; an adduct of the organic diisocyanate with a polyhydric alcohol, a low-molecular-weight polyester resin, water or the like; a polymer of such organic diisocyanates; isocyanate-biurets; etc. Representative commercial products of polyisocyanate compounds are those available under the trademarks: "BURNOCK D-750, -800, DN-950, DN-970 and 15-455"(products of Dainippon Ink And Chemicals Incorporated), "DESMODUL L, NHL, IL and N3390"(products of Bayer AG, West Germany), "TAKENATE D-102, -202,110N and -123N"(products of Takeda Chemical Industries, Ltd.), "COLONATE-L, -HL, -EH and -203"(products of Nippon Polyurethane Kogyo K.K.), "DURANATE 24A-90CX"(product of Asahi Chemical Industry Co., Ltd.), etc. Also usable as the polyepoxy compound are an adduct of a compound of the formula

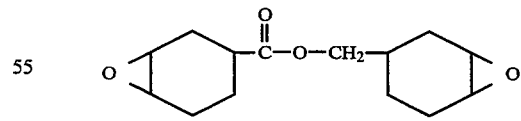

with a polybasic acid; a product prepared by oxidizing an ester having unsaturated group such as a group

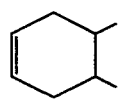

in the molecule with a peracetic acid or the like, examples of the ester being an esterification product of 900 in number-average molecular weight prepared by esterifying tetrahydrophthalic anhydride, trimethylol-propane, 1,4-butanediol and the like.

isocyanato-containing epoxy compound

Examples of such compound include those prepared by reacting the hydroxy-containing epoxy compound with the polyisocyanate compound such that the epoxy and isocyanato groups remain in the reaction product. Examples of such reaction product are a reaction product of the compound of the formula (11) with a hexamethylene diisocyanate

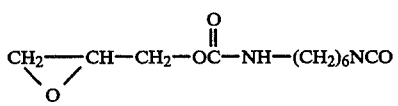

a reaction product of the compound of the formula (15) with a tolylene diisocyanate

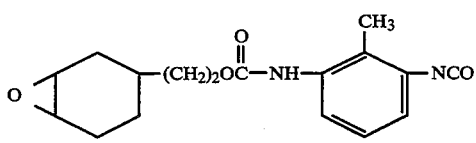

a reaction product of the compound of the formula (18) with an isophorone diisocyanate

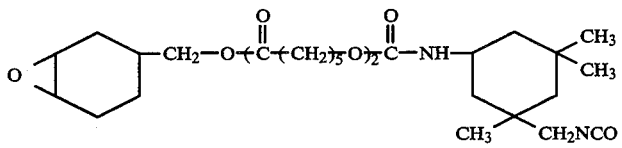

a reaction product of the compound of the formula (20) with an isophorone diisocyanate

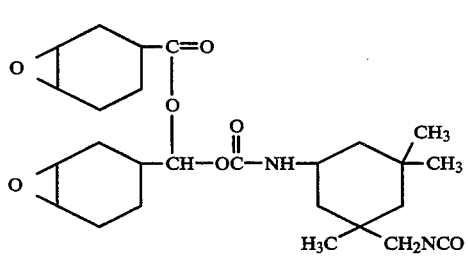

a reaction product of the compound of the formula (21) with a xylylene diisocyanate

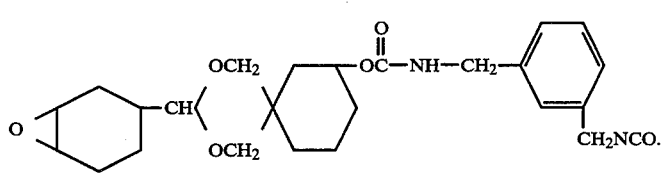

Compound (C)

The compound (C) useful for the essential component (1) has at least one silane group and at least one functional group reactive with the functional group of the resin (A) in the molecule. The functional group reactive with the functional group of the resin (A) may be silane.

In this case, the compound contains at least two silane groups in the molecule.

Described below are typical examples of the compound (C).

Hydroxyl-containing silane compound

Examples of such compound are those represented by the formulas (34) to (36)

  (34)

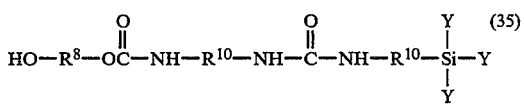  (35)

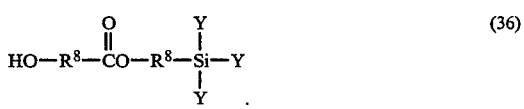  (36)

In the formulas, $R^8$, $R^{10}$ and Y are as defined above; the groups $R^8$ are the same or different, the groups $R^{10}$ are the same or different, and the groups Y are the same or different, provided that at least one of the groups Y is a hydrogen atom, a hydroxyl group or a hydrolyzable group.

Specific examples of the compounds of the formulas (34) to (36) are those represented by the formulas

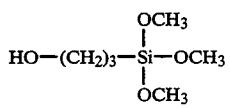

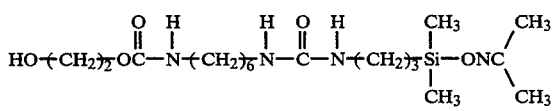

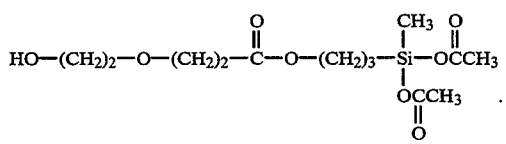

Polysilane compound

The polysilane compound contains, in the molecule, at least two groups selected from hydrolyzable groups directly attached to silicon atom and SiOH group.

Examples of such compound are those represented by the formulas (37) to (39)

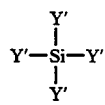  (37)

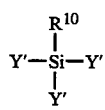  (38)

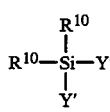  (39)

In the foregoing formulas, the groups Y' are the same or different and each represent a hydrogen atom, a hydroxyl group or a hydrolyzable group, $R^{10}$ is as defined above and the groups $R^{10}$ are the same or different.

Specific examples of the compounds having the formulas (37) to (39) are dimethyldimethoxysilane, dibutyldimethoxysilane, diisopropyldipropoxysilane, diphenyldibutoxysilane, diphenyldiethoxysilane, diethyldisilanol, dihexyldisilanol, methyltrimethoxysilane, methyltriethoxysilane, ethyltriethoxysilane, propyltrimethoxysilane, phenyltriethoxysilane, phenyltributoxysilane, hexyltriacetoxysilane, methyltrisilanol, phenyltrisilanol, tetramethoxysilane, tetraethoxysilane, tetrapropoxysilane, tetraacetoxysilane, diisopropioxydivalerooxysilane, tetrasilanol, and the compounds represented by the formulas

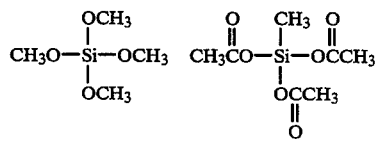

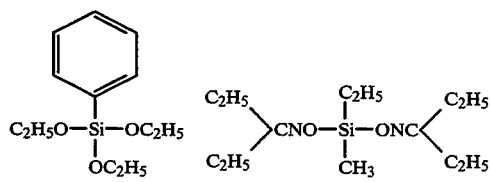

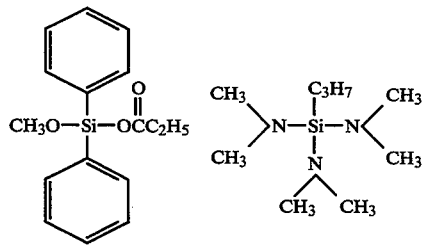

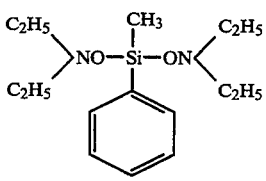

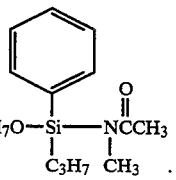

Condensation products of such polysilane compounds are also usable.

Epoxy-containing silane compound

Examples of such compound include the foregoing silane-containing epoxy compounds.

Isocyanato-containing silane compound

Examples of such compound include compounds represented by the formulas (40) and (41)

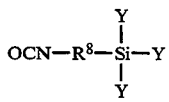  (40)

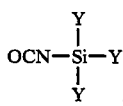  (41)

In the foregoing formulas, $R^8$ and Y are as defined above and the groups Y are the same or different.

At least one of the groups Y is a hydrogen atom, a hydroxyl group or a hydrolyzable group.

Examples of the compounds of the formulas (40) and (41) are those represented by the formulas OCNC₃H₆Si(OC₂H₅)₃,
OCNC₂H₄Si(OCH₃)₃,

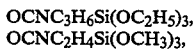

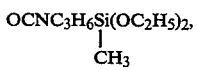

OCNCH₂Si(OC₂H₅)₃,
OCNCH₂Si(OCH₃)₃,

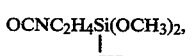

OCNCH₂Si(OCH₃)₃,

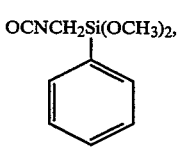

-continued

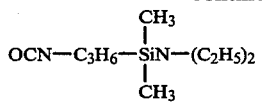

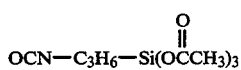

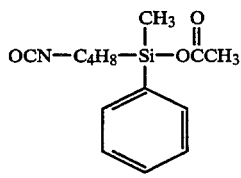

OCN—Si(OCH3)3

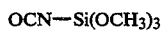

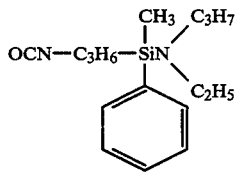

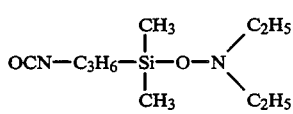

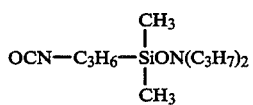

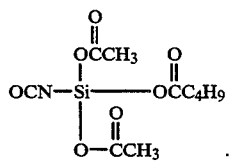

Also usable as the isocyanato-containing silane compound is a compound prepared by reacting the hydroxyl-containing silane compound with the polyisocyanate compound.

Examples of such isocyanato-containing silane compound include a reaction product of the compound of the formula (34) and a hexamethylene diisocyanate or tolylene diisocyanate, such as compounds represented by the formulas

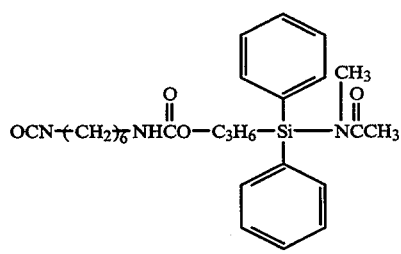

-continued

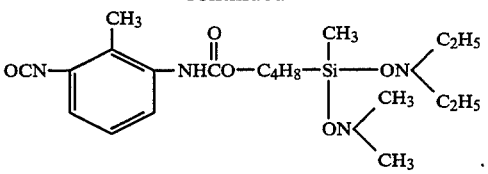

Useful isocyanato-containing silane compounds further include a condensation product of the epoxy-containing silane compound with, e.g. the polysilane compound, such as those represented by the formula

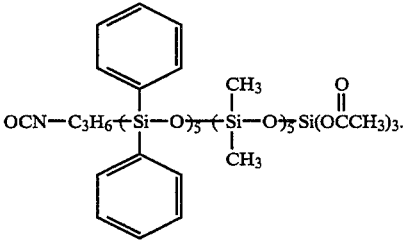

Mercapto-containing silane compound

Examples of such compound include the compounds represented by the formula (42)

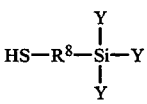 (42)

wherein $R^8$ and Y are as defined above, and the groups Y are the same or different provided that at least one of the groups Y is a hydrogen atom, a hydroxyl group or a hydrolyzable group.

Specific examples of the compound of the formula (42) are those represented by the formula

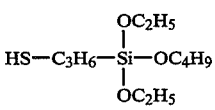

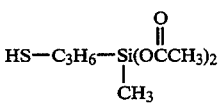

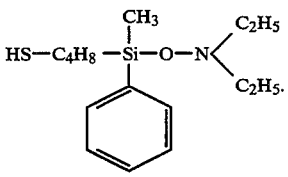

Also usable as mercapto-containing silane compound is a reaction product prepared by reacting the hydroxyl-containing silane compound with the polyisocyanate compound and a thiocol compound (e.g. HS—$C_mH_{2m}$—OH wherein m has the same meaning as above), such as the compound represented by the formula

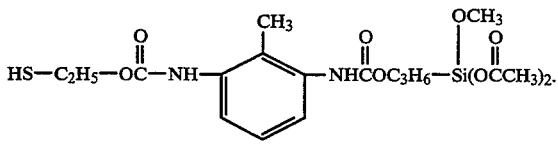

NH— or NH$_2$-containing silane compound

Examples of such compound include the compounds represented by the formulas (43) and (44)

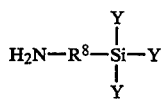 (43)

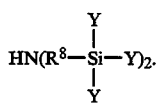 (44)

In the foregoing formulas, R$^8$ and Y are as defined above, the groups R$^8$ are the same or different, and the groups Y are the same or different, provided that at least one of the groups Y is a hydrogen atom, a hydroxyl group or a hydrolyzable group.

Specific examples of the compounds of the formulas (43) and (44) are those represented by the formulas

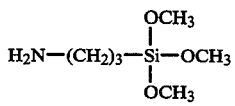

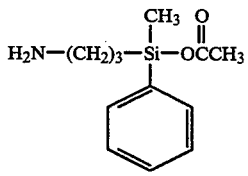

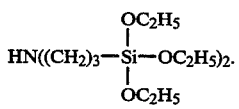

Also usable are a condensation product of the compound of the formula (43) or (44) with the polysilane compound, such as a compound represented by the formula

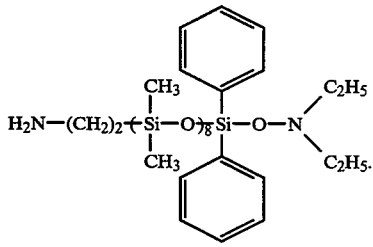

Unsaturated group-containing silane compound

Usable as such compound is a silane-containing polymerizable unsaturated monomer (K) to be described later.

The resin (A) may have a number-average molecular weight of about 1,000 to about 200,000, preferably about 3,000 to about 80,000.

The compounds (B) and (C) may have a number-average molecular weight of about 120 to about 10,000, preferably about 120 to about 3,000.

The reaction product (D) prepared by reacting the resin (A) with compounds (B) and (C) has epoxy and silane groups, each numbering at least one, preferably 2 to 40, on the average per molecule. The epoxy and silane contents lower than the above range give a coating poor in curability and low in resistance to xylol, hardness and mechanical properties, hence undesirable.

Essential component (2)

The resin (E) has at least one functional group reactive with the functional group of the compound (B) on the average per molecule, and can be prepared using monomer components suitable selected from the examples of monomer components for the resin (A).

The compound (B) has at least one functional group reactive with the functional group of the resin (E) and at least one epoxy group on the average per molecule. The functional group of the compound (B) may be epoxy. The same kind of the compound (B) as for the essential component (1) is usable.

The resin (G) has at least one functional group reactive with the functional group of the compound (C) on the average per molecule, and can be prepared using monomer components suitably selected from the examples of monomer components for the resin (A).

The compound (C) has at least one functional group reactive with the functional group of the resin (G) and at least one silane group on the average per molecule. The functional group of the compound (C) may be silane. The same kind of the compound (C) as for the essential component (1).

Both or either of the resins (E) and (G) contains fluorine.

Usable as fluorine-free resins are resins free of as a monomer component the fluorine-containing polymerizable unsaturated monomer (b).

Examples of other fluorine-free resins are as follows.

(1) Hydroxyl-containing polyester resin

The resin is prepared by esterification or ester interchange reaction of a polybasic acid with a polyhydric alcohol. Examples of useful polybasic acids include the compounds having 2 to 4 carboxyl groups or methyl carboxylate groups per molecule such as phthalic acid or anhydride, isophthalic acid, terephthalic acid, maleic acid or anhydride, pyromellitic acid or anhydride, trimellitic acid or anhydride, succinic acid or anhydride, sebacic acid, azelaic acid, dodecanedicarboxylic acid, dimethyl isophthalate, dimethyl terephthalate and the like. Examples of useful polyhydric alcohols are alcohols having 2 to 6 hydroxyl groups per molecule such as ethylene glycol, polyethylene glycol, propylene glycol, neopentyl glycol, 1,6-hexanediol, trimethylolpropane, pentaerythritol, glycerin, tricyclodecanedimethanol, etc. When required, monobasic acids are usable for preparation of the resin and include fatty acids of castor oil, soybean oil, tall oil, linseed oil or the like, and benzoic acid.

(2) Hydroxyl-containing polyurethane resin

The resin is an isocyanato-free resin prepared by modifying a hydroxyl-containing vinyl-type resin, hydroxyl-containing polyester resin or the like with a polyisocyanate compound such as tolylene diisocyanate, xylylene diisocyanate, hexamethylene diisocyanate, isophorone diisocyanate or the like.

(3) Hydroxyl-containing silicone resin

The resin is an alkoxysilane-free and silanol-free resin prepared by modifying a hydroxyl-containing vinyl-type resin, hydroxyl-containing polyester resin or the like with a silicone resin such as Z-6018 or Z-6188 (trademarks for products of Dow Corning GmbH), or SH 5050, SH 6018 or SH 6188 (trademarks for products of Toray Silicone Co., Ltd.).

(4) Vinyl alcohol-styrene copolymer (5) Carboxyl-containing polyester resin such as the resin prepared by esterification of the polybasic acid with the polyhydric alcohol (6) Isocyanato-containing polyester resin The resin is one prepared by admixing the hydroxyl-containing polyester resin with the polyisocyanate compound in such proportions that the resulting resin contains an excess amount of isocyanato group.

The resins (E) and (G) has a number-average molecular weight of about 1,000 to about 200,000, preferably about 3,000 to about 80,000.

The reaction product (F) prepared by reacting the resin (E) and the compound (B) has epoxy numbering at least one, preferably about 2 to about 40, on the average per molecule.

The reaction product (H) prepared by reacting the resin (G) and the compound (C) has silane numbering at least one, preferably about 2 to about 40, on the average per molecule.

The reaction products (F) and (H) having lower epoxy and silane contents than the above range give a coat poor in curability and low in resistance to xylol, hardness, mechanical properties and the like, hence undesirable.

The reaction products (F) and (H) may be usually mixed to contain epoxy group and silane group in a ratio of the former to the latter in the range of between 1:99 and 99:1.

Essential component (3)

Epoxy-containing polymerizable unsaturated monomer
(J)

The monomer (J) is a compound containing epoxy group and radically polymerizable unsaturated group in the molecule. Examples of the radically polymerizable unsaturated group include the groups represented by the formulas $CH_2=C(R^6)COO-$

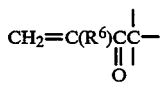

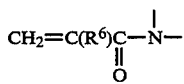

$CH_2=CHCH_2-O-$ $CH_2=CHO-$ $CH_2=CH-$

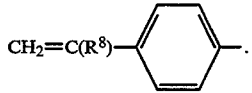

In the foregoing formula, $R^6$ is as defined above.

Examples of the epoxy-containing polymerizable unsaturated monomer having radically polymerizable unsaturated group $CH_2=C(R^6)COO-$ include the compounds represented by the formulas (45) to (57)

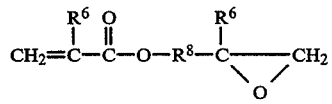 (45)

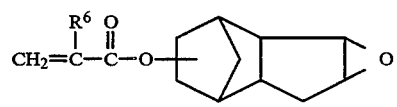 (46)

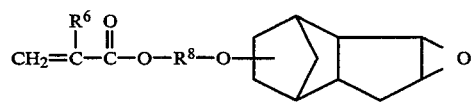 (47)

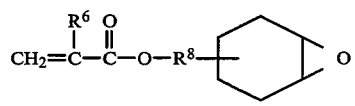 (48)

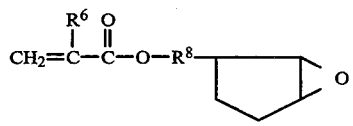 (49)

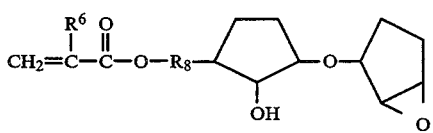 (50)

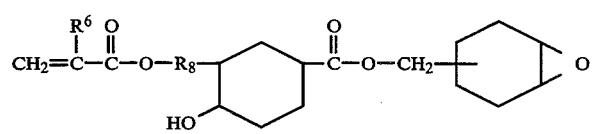 (51)

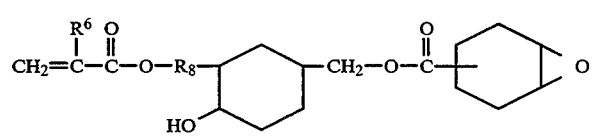 (52)

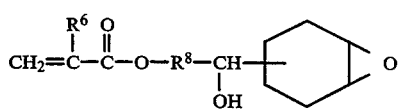 (53)

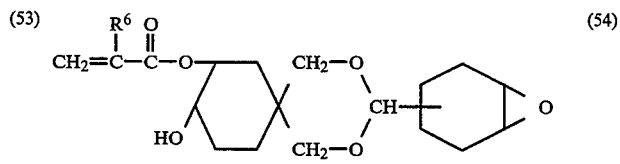 (54)

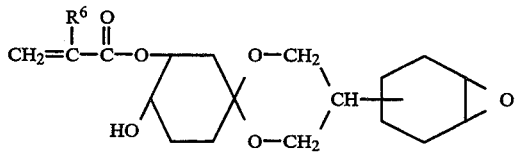 (55)

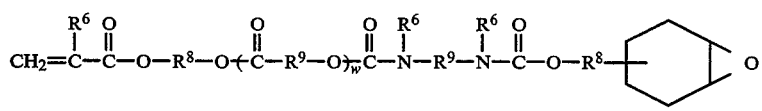 (56)

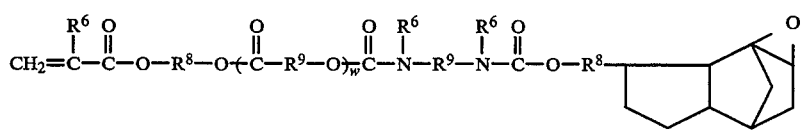 (57)

In the foregoing formula, $R^6$, $R^8$, $R^9$ and w are as defined above, the groups $R^6$ are the same or different, the groups $R^8$ are the same or different and the groups $R^9$ are the same or different.

Specific examples of the monomers of the formulas (45) to (57) are those represented by the formulas Examples of the epoxy-containing polymerizable unsaturated monomer having radically polymerizable unsaturated group

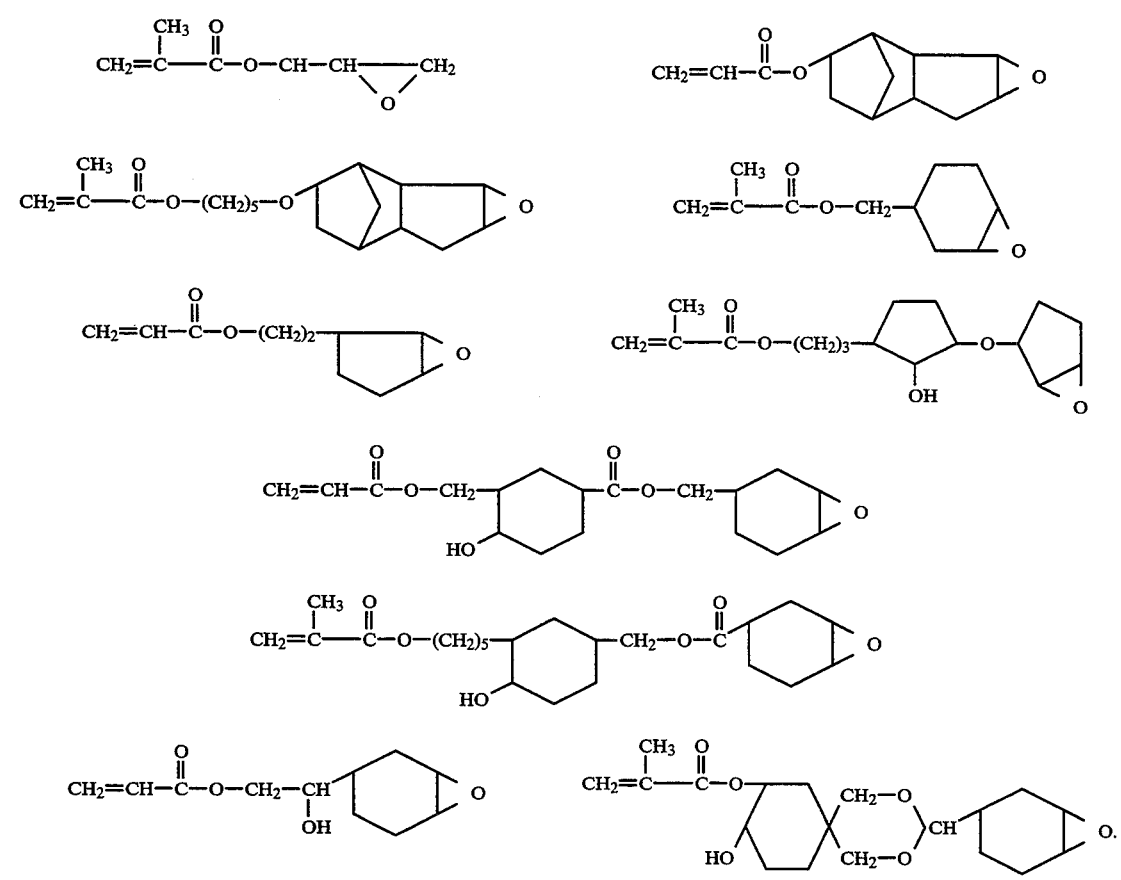

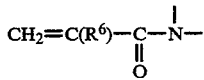

are those represented by the formulas (58) to (60)

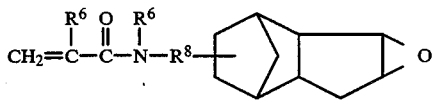
(58)

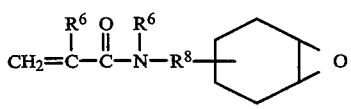
(59)

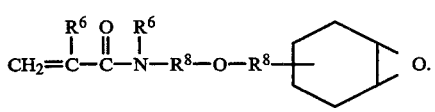
(60)

In the foregoing formulas, $R^6$ and $R^8$ are as defined above, the groups $R^6$ are the same or different, and the groups $R^8$ are the same or different.

Specific examples of the compounds of the formulas (58) to (60) include those represented by the formulas

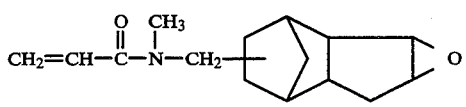

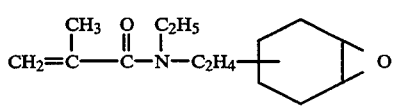

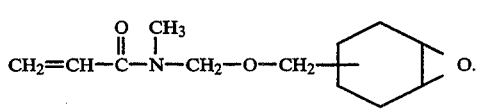

Examples of the epoxy-containing polymerizable unsaturated monomer having radically polymerizable unsaturated group

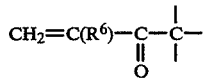

are inclusive of those represented by the formulas (61) to (63)

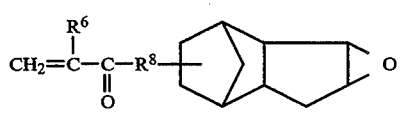
(61)

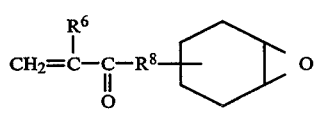
(62)

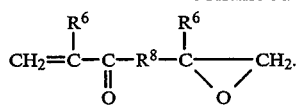
(63)

In the foregoing formulas, $R^6$ and $R^8$ are as defined above, the groups $R^6$ are the same or different, and the groups $R^8$ are the same or different.

Specific examples of the compounds of the formulas (61) to (63) are those represented by the formulas

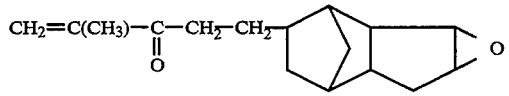

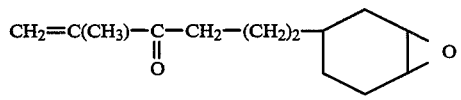

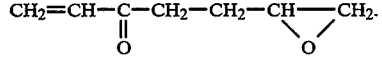

Examples of the epoxy-containing polymerizable unsaturated monomers having radically polymerizable unsaturated group

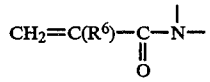

are those represented by the formulas (64) to (69)

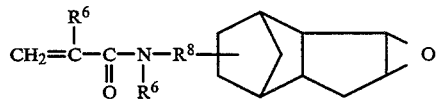
(64)

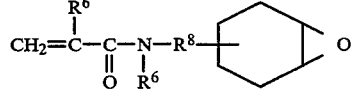
(65)

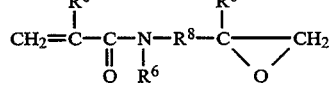
(66)

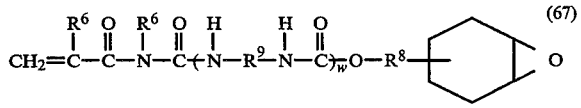
(67)

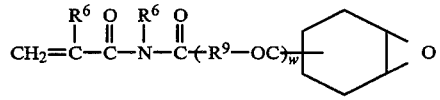
(68)

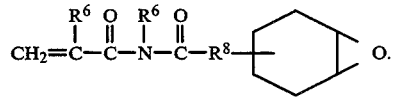
(69)

In the foregoing formula $R^6$, $R^8$, $R^9$ and w are as defined above, the groups $R^6$ are the same or different, the groups $R^8$ are the same or different and the groups $R^9$ are the same or different.

Specific examples of the compounds of the formulas (64) to (69) are those represented by the formulas

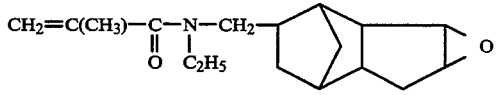

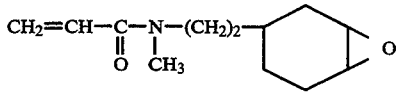

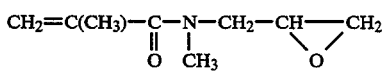

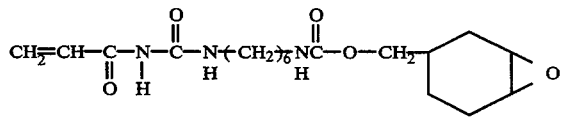

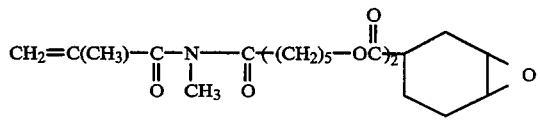

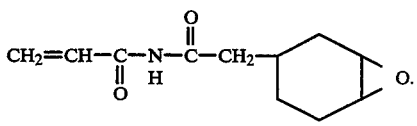

Examples of the epoxy-containing polymerizable unsaturated monomer having radically polymerizable unsaturated group $CH_2=CHCH_2O-$ are those represented by the formulas (70) to (73)

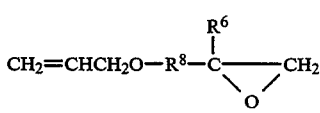 (70)

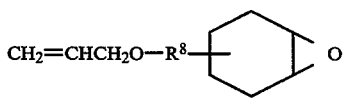 (71)

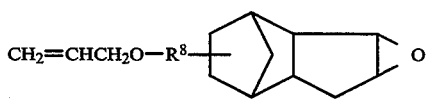 (72)

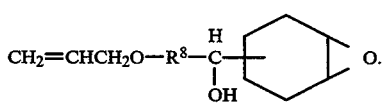 (73)

In the foregoing formulas, $R^6$ and $R^8$ are as defined above, and the groups $R^8$ are the same or different.

Specific examples of the compounds of the formulas (70) to (73) include those represented by the formulas

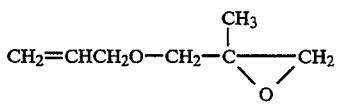

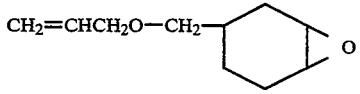

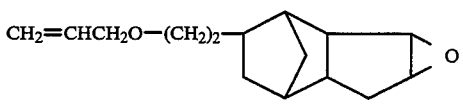

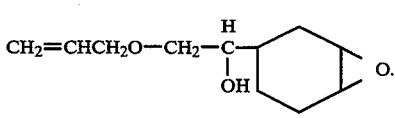

Examples of the epoxy-containing polymerizable unsaturated monomer having radically polymerizable unsaturated group $CH_2=CHO-$ are inclusive of those represented by the formulas (74) to (76)

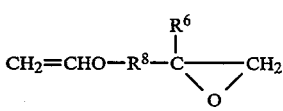 (74)

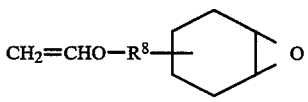 (75)

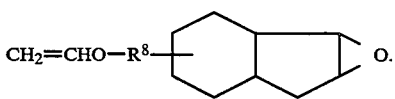 (76)

In the foregoing formulas, $R^6$ and $R^8$ are as defined above, and the groups $R^8$ are the same or different.

Specific examples of the compounds of the formulas (74) to (76) are those represented by the formulas

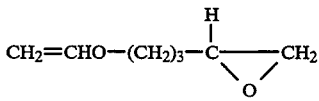

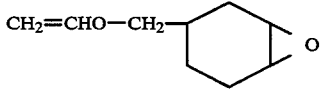

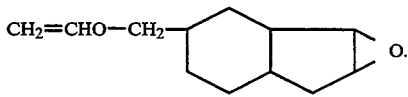

Examples of the epoxy-containing polymerizable unsaturated monomer having radically polymerizable unsaturated group $CH_2=CH-$ include the compounds represented by the formulas (77) to (79)

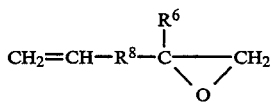 (77)

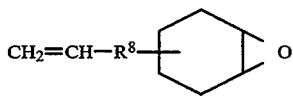 (78)

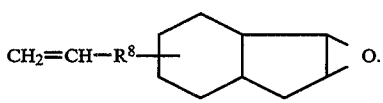 (79)

In the foregoing formulas, $R^6$ and $R^8$ are as defined above, and the groups $R^8$ are the same or different.

Specific examples of the compounds of the formulas (77) to (79) include those represented by the formulas

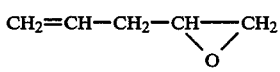

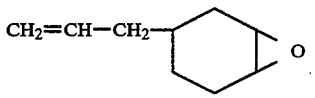

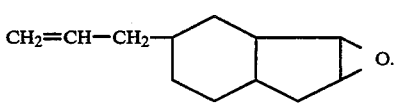

Examples of the epoxy-containing polymerizable unsaturated monomer having radically polymerizable unsaturated group

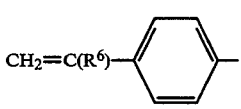

include the compounds represented by the formulas (80) to (84)

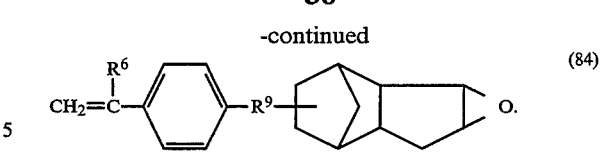

In the foregoing formulas, $R^6$, $R^8$ and $R^9$ are as defined above, the groups $R^6$ are the same or different and the groups $R^9$ are the same or different.

Specific examples of the compounds of the formulas (80) to (84) include those represented by the formulas

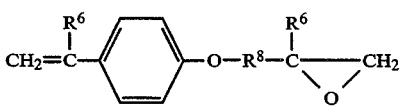

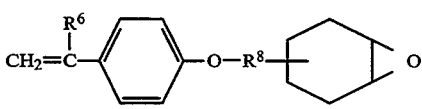

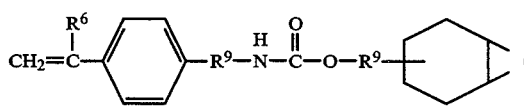

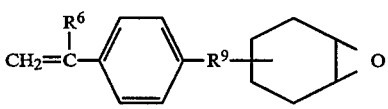

Silane-containing polymerizable unsaturated monomer (K)

The monomer (K) is a compound having at least one silane group and radically polymerizable unsaturated group per molecule. Examples of the radically polymerizable unsaturated group are those represented by the formulas $CH_2{=}C(R^6){-}COO{-}$ $CH_2{=}C(R^6)\text{—}\bigcirc\text{—}$ $CH_2{=}C(R^6){-}$ $CH_2{=}CHO{-}$ $CH_2{=}CHCH_2O{-}$ wherein $R^6$ is as defined above.

Examples of the silane-containing polymerizable unsaturated monomer having radically polymerizable unsaturated group $CH_2{=}C(R^6){-}COO{-}$ include the compounds represented by the formula (85)

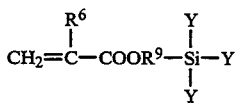
(85)

wherein $R^6$, $R^9$ and Y are as defined above, the groups Y are the same or different and at least one of groups Y is a hydrogen atom, a hydroxyl group or a hydrolyzable group.

Examples of the compounds of the formula (85) are γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-(meth)acryloxypropyldimethylethoxysilane, γ-(meth)acryloxypropylphenylmethylmethoxysilane, γ-(meth)acryloxypropylphenylmethylethoxysilane, γ-(meth)acryloxypropyltrisilanol, γ-(meth)acryloxypropylmethyldihydroxysilane, γ-(meth)acryloxybutylphenyldihydroxysilane, γ-(meth)acryloxypropyldimethylhydroxysilane, γ-(meth)acryloxypropylphenylmethylhydroxysilane, and compounds represented by the formulas

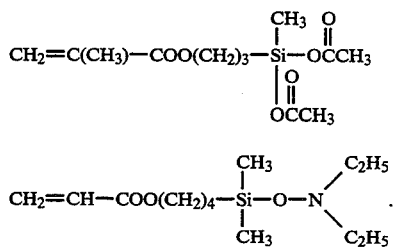

Examples of the silane-containing polymerizable unsaturated monomer having radically polymerizable unsaturated group

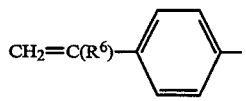

include the compounds represented by the formulas (86) to (88)

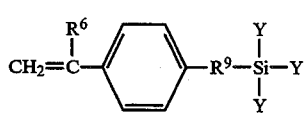
(86)

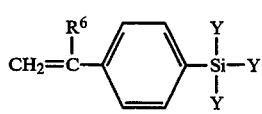
(87)

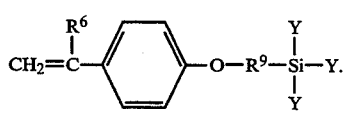
(88)

In the foregoing formulas, $R^6$, $R^9$ and Y are as defined above, the groups Y are the same or different, and at least one of the groups Y is a hydrogen atom, a hydroxyl group or a hydrolyzable group.

Specific examples of the compounds of the formulas (86) to (88) include the compounds represented by the formulas

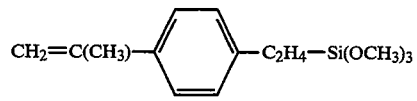

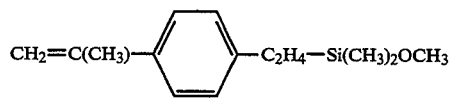

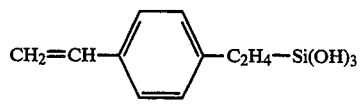

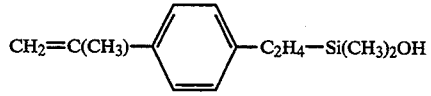

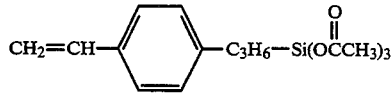

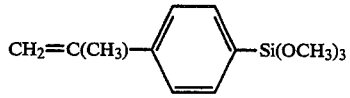

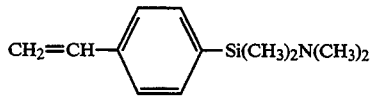

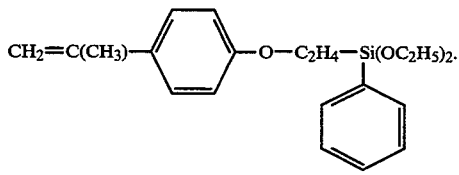

Examples of the silane-containing polymerizable unsaturated monomer containing radically polymerizable unsaturated group of the formula $CH_2\!\!=\!\!C(R^6)$— include the compounds of the formulas (89) and (90)

(89)

(90)

In the formulas (89) and (90), $R^6$, $R^9$ and Y are as defined above, the groups Y may be the same or different and at least one of the groups Y is a hydrogen atom, a hydroxyl group or a hydrolyzable group.

Specific examples of the compounds of the formulas (89) and (90) are those represented by the formulas $$CH_2=CH-Si(OCH_3)_3$$

$$CH_2=CH-Si(OC_2H_5)_3$$

$$CH_2=CH-Si(OCH_3)_2CH_3$$

$$CH_2=CH-Si(CH_3)_2OCH_3$$

$$CH_2=CH-CH_2-Si(OCH_3)_3$$

$$CH_2=CH-Si(O\overset{O}{\overset{\|}{C}}CH_3)_3$$

$$CH_2=CH-CH_2-Si(O\overset{O}{\overset{\|}{C}}CH_3)_3$$

$$CH_2=CH-Si(CH_3)_2N(CH_3)_2$$

$$CH_2=CH-\underset{\underset{C_6H_5}{|}}{\overset{\overset{CH_3}{|}}{Si}}-\underset{}{\overset{\overset{CH_3}{|}}{N}}-\overset{O}{\overset{\|}{C}}-CH_3$$

$$CH_2=CH-Si(-C_6H_4-)_2ON(CH_3)_2.$$

Examples of the silane-containing polymerizable unsaturated monomer having radically polymerizable unsaturated group of the formula $CH_2=CHO-$ include the compounds represented by the formulas (91) and (92).

$$CH_2=CHO-R^9-\underset{\underset{Y}{|}}{\overset{\overset{Y}{|}}{Si}}-Y \tag{91}$$

$$CH_2=CHO-\underset{\underset{Y}{|}}{\overset{\overset{Y}{|}}{Si}}-Y. \tag{92}$$

In the foregoing formulas, $R^9$ and Y are as defined above, the groups Y may be the same or different and at least one of the groups Y is a hydrogen atom, a hydroxyl group or a hydrolyzable group.

Specific examples of the compounds represented by the formulas (91) and (92) are $$CH_2=CHO-(CH_2)_3\underset{\underset{CH_3}{|}}{\overset{\overset{CH_3}{|}}{Si}}-\underset{\underset{H}{|}}{N}\overset{O}{\overset{\|}{C}}CH_3$$

$$CH_2=CHO-(CH_2)_2\underset{\underset{OCH_3}{|}}{\overset{\overset{CH_3}{|}}{Si}}-OCH_3$$

$$CH_2=CHO-\underset{\underset{CH_3}{|}}{\overset{\overset{CH_3}{|}}{Si}}-O-N\underset{CH_3}{\overset{CH_3}{\diagup\!\!\diagdown}}$$

$$CH_2=CHO-\underset{\underset{CH_3}{|}}{\overset{\overset{CH_3}{|}}{Si}}-ON\underset{C_2H_5}{\overset{C_2H_5}{\diagup\!\!\diagdown}}.$$

Examples of the silane-containing polymerizable unsaturated monomer having radically polymerizable unsaturated group of the formula $CH_2=CHCH_2O-$ include the compounds of the formulas (93) and (94)

$$CH_2=CHCH_2O-\underset{\underset{Y}{|}}{\overset{\overset{Y}{|}}{Si}}-Y \tag{93}$$

$$CH_2=CHCH_2O-R^9-\underset{\underset{Y}{|}}{\overset{\overset{Y}{|}}{Si}}-Y. \tag{94}$$

In the foregoing formulas (93) and (94), $R^9$ and Y are as defined above, the groups Y may be the same or different and at least one of the groups Y is a hydrogen atom, a hydroxyl group or a hydrolyzable group.

Specific examples of the compounds of the formulas (93) and (94) include those represented by the formulas $$CH_2=CHCH_2O-\underset{\underset{C_6H_5}{|}}{\overset{\overset{C_2H_5}{|}}{Si}}-N\underset{CH_3}{\overset{CH_3}{\diagup\!\!\diagdown}}$$

$$CH_2=CHCH_2O-\underset{\underset{C_6H_5}{|}}{\overset{\overset{C_6H_5}{|}}{Si}}-\underset{\underset{H}{|}}{N}\overset{O}{\overset{\|}{C}}C_2H_5$$

$$CH_2=CHCH_2O-(CH_2)_3-\underset{\underset{\overset{OCCH_3}{\underset{\|}{O}}}{|}}{\overset{\overset{OCH_3}{|}}{Si}}-O\overset{O}{\overset{\|}{C}}C_2H_5$$

$$CH_2=CHCH_2O-(CH_2)_2-\underset{\underset{CH_3}{|}}{\overset{\overset{OC_2H_5}{|}}{Si}}-OC_2H_5.$$

Also usable as the silane-containing polymerizable unsaturated monomer is a polysiloxane unsaturated monomer containing silane group and polymerizable unsaturated group and prepared by reacting the above silane-containing polymerizable unsaturated monomer with, for example, a polysilane compound such as the compounds of the formulas (38) to (40).

Representative of the polysiloxane unsaturated monomer is a polysiloxane macromonomer prepared by reacting about 30 to about 0.001 mole % of a compound of the formula (85) with about 70 to about 99.999 mole % of at least one of the compounds of the formulas (38) to (40) (for example those disclosed in Japanese Unexamined Patent Publication No. 275132/1987). Also useful as the polysiloxane unsaturated monomer are the compounds represented by the formulas

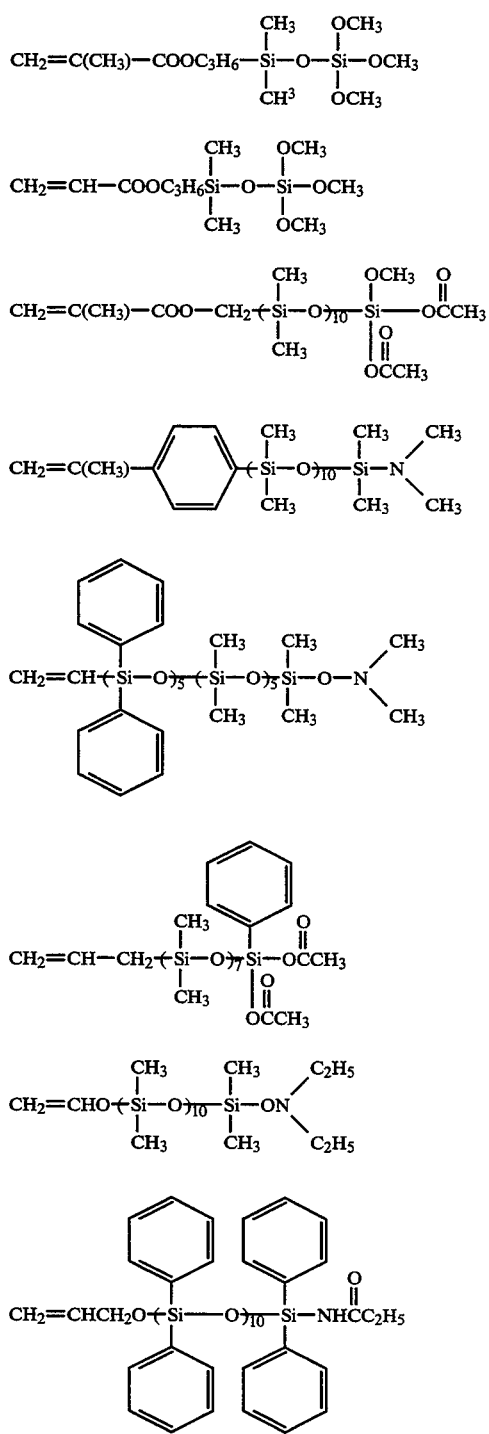

-continued $$CH_2=CHCH_2O-C_2H_4\text{-}(Si-O)_{\overline{10}}-Si-OC_2H_5$$
with OC$_2$H$_5$, OC$_2$H$_5$, CH$_3$, CH$_3$ substituents.

Fluorine-containing polymerizable unsaturated monomer (b)

The examples of the fluorine-containing polymerizable unsaturated monomer (b) as given hereinbefore are usable.

Polymerizable unsaturated monomers (M)

Usable as the monomer (M) is a compound having radically polymerizable unsaturated group and free of group active with the epoxy group of the monomer (J) or the silane group of the monomer (K). Specific examples of the monomer (M) are the hydroxyl-containing polymerizable unsaturated monomer (a), the polymerizable unsaturated monomers (c-1) to (c-6), and the like.

The copolymer (L) prepared by subjecting the monomer (J), the monomer (K), the monomer (b) and when required the monomer (M) to radical polymerization has epoxy and silane groups each numbering at least one, preferably 2 to 40 on the average per molecule. A copolymer having less epoxy and silane groups than said range gives a coat low in curability and poor in resistance to xylol, hardness and mechanical properties, hence undesirable.

Essential component (4)

Usable as the monomer (J), the monomer (K), the monomer (b) and the monomer (M) for the essential component (4) are the monomers described above as useful for the essential component (3).

Each of the homopolymer (N) of the monomer (J) and the copolymer (N) of the monomer (J) with the monomer (M) has epoxy group numbering at least one, preferably 2 to 40 on the average per molecule.

Each of the homopolymer (P) of the monomer (K) and the copolymer (P) of the monomer (K) with the monomer (M) has silane group numbering at least one, preferably 2 to 40 on the average per molecule.

The copolymer (N) having less epoxy group than said range or the copolymer (P) having less silane group than said range gives a coat lower in curability and poor in resistance to xylol, hardness and mechanical properties, hence undesirable.

The homopolymer or copolymer (N) and the homopolymer or copolymer (P) are used in such amounts that the epoxy to silane ratio is 1/99 to 99/1.

At least one of the homopolymer or copolymer (N) and the homopolymer or copolymer (P) is a fluorine-containing polymer.

Useful as the fluorine-containing copolymer are a copolymer prepared by copolymerizing the monomer (J), the monomer (b) and when required the monomer (M), and a copolymer prepared by copolymerizing the monomer (K), the monomer (b) and when required the monomer (M). Examples of the fluorine-free copolymer include those prepared without use of the monomer (b).

Essential component (5)

The polymerizable unsaturated monomer (Q) useful for the essential component (5) has in the molecule radically polymerizable unsaturated group and functional group reactive with the functional group of the compound (S).

The functional group of the monomer (Q) is inactive to epoxy group and may be epoxy.

Examples of the copolymer (R) useful for the essential monomer (5) are given below in (1) to (3).

(1) A copolymer having hydroxyl group as a functional group and prepared by subjecting to radical polymerization the hydroxyl-containing polymerizable unsaturated monomer (a), the epoxy-containing polymerizable unsaturated monomer (J), the fluorine-containing polymerizable unsaturated monomer (b) and when required the polymerizable unsaturated monomer (c).

(2) A copolymer having isocyanato group as a functional group and prepared by subjecting to radical polymerization the isocyanato-containing polymerizable unsaturated monomer (e), the epoxy-containing polymerizable unsaturated monomer (J), the fluorine-containing polymerizable unsaturated monomer (b) and when required the polymerizable unsaturated monomer (c).

(3) A copolymer having epoxy group as a functional group and prepared by subjecting to radical polymerization the epoxy-containing polymerizable unsaturated monomer (J), the fluorine-containing polymerizable unsaturated monomer (b) and when required the polymerizable unsaturated monomer (c).

The compound (S) has silane group and functional group reactive with the functional group of the copolymer (R) and is suitably selectable from the examples given hereinbefore of the compound (C).

The reaction product (T) prepared by reacting the copolymer (R) with the compound (S) has epoxy and silane groups each numbering at least one, preferably 2 to 40, on the average per molecule. The reaction product having less epoxy group or less silane group than said range gives a coat low in curability and poor in resistance to xylol, hardness and mechanical properties, hence undesirable.

Essential component (6)

The polymerizable unsaturated monomer (U) useful for the essential component (6) is a compound having in the molecule radically polymerizable unsaturated group and functional group reactive with the functional group of the compound (W).

The functional group of the monomer (U) is inactive to silane group and may be silane.

Examples of the copolymer (V) useful for the essential component (6) are given below in (1) to (3).

(1) A copolymer having hydroxyl group as a functional group and prepared by subjecting to radical polymerization the hydroxyl-containing polymerizable unsaturated monomer (a), the silane-containing polymerizable unsaturated monomer (K), the fluorine-containing polymerizable unsaturated monomer (b) and when required the polymerizable unsaturated monomer (c).

(2) A copolymer having isocyanato group as a functional group and prepared by subjecting to radical polymerization the isocyanato-containing polymerizable unsaturated monomer (e), the silane-containing polymerizable unsaturated monomer (K), the fluorine-containing polymerizable unsaturated monomer (b) and when required the polymerizable unsaturated monomer (c).

(3) A copolymer having carboxyl group as a functional group and prepared by subjecting to radical polymerization the carboxyl-containing polymerizable unsaturated monomer (d), the silane-containing polymerizable unsaturated monomer (K), the fluorine-containing polymerizable unsaturated monomer (b) and when required the polymerizable unsaturated monomer (c).

The compound (W) contains epoxy group and functional group reactive with the functional group of the copolymer (V) and is suitably selectable from the examples given hereinbefore of the compound (B).

The reaction product (X) prepared by reacting the copolymer (V) with the compound (W) has epoxy and silane groups each numbering at least one, preferably 2 to 40, on the average per molecule. The reaction product having less epoxy group or less silane group than said range forms a coat low in curability and poor in resistance to xylol, hardness and mechanical properties, hence undesirable.

Essential component (7)

The reaction product (H) and the polymer (N) can be the polymers and reaction products described hereinbefore as useful for the essential components (2) and (4).

The polymer (N) and the reaction product (H) can be used in such amounts that the epoxy to silane ratio is 1/99 to 99/1.

At least one of the polymer (N) and the reaction product (H) is a fluorine-containing resin.

Essential component (8)

The reaction product (F) and the polymer (P) can be those described above as useful for the essential components (2) and (4).

The polymer (P) and the reaction product (F) are used in such amounts that the epoxy to silane ratio is 1/99 to 99/1.

At least one of the polymer (P) and the reaction product (F) is a fluorine-containing resin.

Essential component (9)

The silane-containing fluorine-containing resin for the essential component (9) can be one containing fluorine atom and selectable from the examples of the reaction product (H) given hereinbefore as useful for the essential component (2) and the examples of the polymer (P) given above as useful for the essential component (4).

Useful compounds containing at least two epoxy groups on the average per molecule include the polyepoxy compound described above as useful for the essential component (1).

Essential component (10)

The epoxy-containing fluorine-containing resin useful for the essential component (10) includes one containing fluorine atom and selected from the examples of the product (F) given hereinbefore as useful for the essential component (2) and the examples of the polymer (N) given above as useful for the essential component (4).

Examples of the compound containing at least two silane groups on the average per molecule include the polysilane compound described above as useful for the essential component (1).

According to the present invention, the essential components (1), (3), (5) and (6) containing hydroxyl group in addition to silane and epoxy groups advantageously give a coat improved in curability and outstanding in resistance to xylol, hardness, mechanical properties and the like. These essential components may contain hydroxyl numbering at least one, preferably about 2 to about 40, on the average per molecule.

Hydroxyl groups can be introduced into the essential component by various methods. For example, hydroxyl groups can be introduced into the essential component (1) by reacting the hydroxyl-containing resin with the compounds (B) and (C) so that the hydroxyl groups in the resin partially remain, by reacting the functional group of the resin (A) with the functional group of the compounds (B) or (C) to form hydroxyl group (for example, reacting epoxy group with carboxyl group) or by introducing group reactive with hydroxyl group (such as isocyanato group) into the reaction product of the resin (A) with the compounds (B) and (C) and reacting the reaction product with a polyhydric alcohol compound (such as propylene glycol, polypropylene glycol, ethylene glycol, polyethylene glycol, neopentyl glycol or the like) in such amount as to provide an excess of hydroxyl group. Into the essential components (3), (5) and (6), hydroxyl groups can be introduced by using the hydroxyl-containing polymerizable unsaturated monomer (a) as a monomer component.

The constituents for the essential components (1) to (10) described hereinbefore can be prepared by conventional methods. More specifically the reaction between hydroxyl and isocyanato groups, condensation reaction of silane groups, copolymerization reaction and the like can be conducted in a conventional manner. For example, the reaction between isocyanato and hydroxyl groups is effected at a temperature between room temperature and 130° C. for about 30 to about 360 minutes. The condensation reaction of silane groups is conducted in the presence of an acid catalyst (for example, hydrochloric acid, sulfuric acid, formic acid, acetic acid or the like) with heating at a temperature of about 40° to about 150° C. for about 1 to about 24 hours. The copolymerization reaction is carried out in the same manner under the same conditions as the reaction for synthesis of conventional acrylic or vinyl resin. Such synthetic reaction can be carried out, for example, by dissolving or dispersing the monomer component in an organic solvent and heating the solution or dispersion in the presence of a radical polymerization initiator at a temperature of about 40° to about 180° C. with stirring. The reaction time usually ranges from about 1 to about 24 hours. Useful organic solvents include those inactive to the monomer or the compound to be used for polymerization, such as ether solvents, ester solvents or hydrocarbon solvents. The hydrocarbon solvent is preferably used in combination with a different solvent in view of a high solubility. The radical polymerization initiator can be any of polymerization initiators commonly employed and including peroxides such as benzoyl peroxide, t-butyl peroxy-2-ethylhexanoate and the like and azo compounds such as azobisisobutyronitrile, azobisdimethylvaleronitrile and the like.

The reaction products (D), (F), (H), (L), (N), (P), (T) and (X) for the essential components (1) to (8) have a number average molecular weight of about 1,000 to about 200,000, preferably about 3,000 to about 80,000. If the reaction product has a number average molecular weight lower than about 1,000, the resulting coat is poor in resistance to scratching, staining, weather and acids and the like. On the other hand, the reaction product with a number average molecular weight higher than about 200,000 gives a coating composition poor in storage stability, amenability to coating operation and the like. Therefore the reaction products with the number average molecular weight outside said range are undesirable.

Each of the essential components (1) to (10) comprises as a monomer component of the fluorine-containing resin about 1 to about 70% by weight, preferably about 5 to about 60% by weight, of the fluorine-containing polymerizable unsaturated monomer (b) based on the total weight of each of the components (1) to (10) (i.e. based on the non-volatile content). The essential component with a fluorine content less than said range gives a coat having low resistance to scratching, staining, weather and acids. On the other hand, the essential component with a fluorine content above said range incurs a higher production cost and is difficult to manufacture.

In the essential components (1) to (10), the constituent having introduced therein alicyclic epoxy group accelerate the reaction for addition of the epoxy group to hydroxyl group, giving a coat with improved curability.

In preparation of essential components (1) to (10), the use of the monomer of the formula (5) as the fluorine-containing polymerizable unsaturated monomer (b) provides a polymer with fluorine atoms attached to the main chain, giving a coat enhanced in resistance to weather and acids and other properties. The use of the monomer of the formula (6) affords a polymer with the fluorine atoms attached to the side chain which atoms serve to exhibit remarkable water repellency and resistance to staining.

Also useful are modified resins prepared by combining the constituent contained in the above essential components with another resin (such as vinyl resins, polyester resins, urethane resins, silicone resins or the like) partly utilizing such functional group present in the component as hydroxyl, epoxy, silane or the like.

The resin composition of the present invention preferably contains any one of the foregoing essential components (1) to (10).

The resin composition can be used as dissolved or dispersed in an organic solvent. Examples of useful organic solvent are toluene, xylene and like hydrocarbons; methyl ethyl ketone, methyl isobutyl ketone and like ketone solvents; ethyl acetate, butyl acetate and like ester solvents; dioxane, ethylene glycol diethyl ether and like ether solvents; butanol, propanol and like alcohol solvents; etc. These organic solvents can be used singly or at least two of them are usable in mixture.

According to the present invention, a curable composition can be obtained by incorporating a curing catalyst into the resin composition of the invention.

Described below are curing catalysts useful for the curable compositions of the invention.

In the present invention, a metal chelate compound is usable as the curing catalyst.

Useful metal chelate compounds include, for example, aluminum chelate compounds, titanium chelate compounds and zirconium chelate compounds. Among these chelate compounds, those containing as a ligand for forming a stable chelate ring a compound capable of forming a keto-enol tautomer.

Examples of the compound capable of forming a keto-enol tautomer are $\beta$-diketones (such as acetyl acetone), esters of acetoacetic acids (such as methyl acetoacetate), esters of malonic acids (such as ethyl malonate), ketones having hydroxyl group in the β-position (such as diacetone alcohol), aldehydes having hydroxyl group in the β-position (such as salicylaldehyde), esters having hydroxyl group in the β-position (such as methyl salicylate), etc. The use of esters of acetoacetic acids or β-diketones can achieve suitable results.

The aluminum chelate compound can be suitably prepared for example by admixing the comound capable of forming a keto-enol tautomer with an aluminum alkoxide represented by the formula

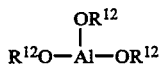
$$R^{12}O-\underset{\underset{OR^{12}}{|}}{Al}-OR^{12} \qquad (95)$$

wherein the groups $R^{12}$ are the same or different and each represent an alkyl group having 1 to 20 carbon atoms or an alkenyl group, usually in a ratio of from about 1 to about 3 moles of the former per mole of the latter, followed when required by heating the mixture.

Examples of the alkyl group having 1 to 20 carbon atoms are undecyl, dodecyl, tridecyl, tetradecyl, octadecyl and the like as well as the above alkyl groups having 1 to 10 carbon atoms. Examples of the alkenyl group are vinyl, allyl and the like.

Examples of the aluminum alkoxide having the formula (95) are aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide and the like. Among them, preferable are aluminum triisopropoxide, aluminum tri-sec-buthoxide, aluminum tri-n-butoxide, etc.

The titanium chelate compound can be suitably prepared for example by mixing the compound capable of forming a keto-enol tautomer with a titanate represented by the formula

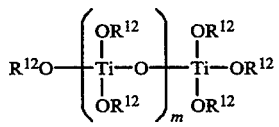
$$R^{12}O-\left(\underset{\underset{OR^{12}}{|}}{\overset{\overset{OR^{12}}{|}}{Ti}}-O\right)_m-\underset{\underset{OR^{12}}{|}}{\overset{\overset{OR^{12}}{|}}{Ti}}-OR^{12} \qquad (96)$$

wherein m is an integer of 0 to 10, and $R^{12}$ is as defined above, usually in a ratio of from about 1 to about 4 moles of the former per mole of the Ti in the titanate, followed by heating when so required.

Examples of the titanate of the formula (96) wherein m is 0 are tetramethyl titanate, tetraethyl titanate, tetra-n-propyl titanate, tetraisopropyl titanate, tetra-n-butyl titanate, tetraisobutyl titanate, tetra-tert-butyl titanate, tetra-n-pentyl titanate, tetra-n-hexyl titanate, tetraisooctyl titanate, tetra-n-lauryl titanate, etc. Suitable results can be achieved by use of tetraisopropyl titanate, tetra-n-butyl titanate, tetra-isobutyl titanate, tetra-tert-butyl titanate and the like. Of the titanares wherein m is 1 or more, those which can achieve good results are dimers to hendecamers (m=1 to 10 in the formula (96)) of tetraisopropyl titanate, tetra-n-butyl titanate, tetraisobutyl titanate, tetra-tert-butyl titanate and the like.

The zirconium chelate compound can be suitably prepared for example by mixing the compound capable of forming a keto-enol tautomer with a zirconate represented by the formula

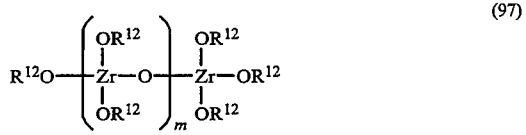
$$R^{12}O-\left(\underset{\underset{OR^{12}}{|}}{\overset{\overset{OR^{12}}{|}}{Zr}}-O\right)_m-\underset{\underset{OR^{12}}{|}}{\overset{\overset{OR^{12}}{|}}{Zr}}-OR^{12} \qquad (97)$$

wherein m and $R^{12}$ are as defined above, usually in a ratio of from about 1 to about 4 moles of the former per mole of the Zr in the zirconate, followed by heating when so required.

Examples of the zirconate of the formula (97) are tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate and the like. Desirable results can be obtained by tetraisopropyl zirconate, tetra-n-propyl zirconate, tetraisobutyl zirconate, tetra-n-butyl zirconate, tetra-sec-butyl zirconate, tetra-tert-butyl zirconate or the like. Of the zirconates wherein m is 1 or more, those which can produce desirable results are dimers to hendecamers (m=1 to 10 in the formula (97)) of tetraisopropyl zirconate, tetra-n-propyl zirconate, tetra-n-butyl zirconate, tetraisobutyl zirconate, tetra-sec-butyl zirconate, tetra-tert-butyl zirconate and the like. The zirconium chelate compound may contain an association of such zirconates as a constituent unit.

Examples of preferred chelate compounds for use in the invention are aluminum chelate compounds such as tris(ethylacetoacetate)aluminum, tris(n-propylacetoacetate)aluminum, tris(isopropylacetoacetate)aluminum, tris(n-butylacetoacetate)aluminum, isopropoxybis(ethylacetoacetate)aluminum, diisopropoxyethylacetoacetate aluminum, tris(acetylacetonato)aluminum, tris(propionylacetonato)aluminum, diisopropoxypropionylacetonato aluminum, acetylacetonato-bis(propionylacetonato)aluminum, monoethylacetoacetate bis-(acetylacetonato)aluminum, tris-(acetylacetonato)aluminum and the like; titanium chelate compounds such as diisopropoxy-bis(ethylacetoacetate)titanate, diisopropoxy-bis-(acetylacetonato)titanate and the like; and zirconium chelate compounds such as tetrakis(acetylacetonato)zirconium, tetrakis(n-propylacetoacetate)zirconium, tetrakis(acetylacetonato)zirconium, tetrakis(ethylacetoacetate)zirconium and the like.

The aluminum chelate compounds, zirconium chelate compounds and titanium chelate compounds can be used singly or at least two of them are usable in mixture. A suitable amount of the curing catalyst is about 0.01 to about 30 parts by weight per 100 parts by weight of the above resin composition, calculated as solids. A smaller amount of the curing catalyst used than said range tends to reduce the crosslinking curability, and a larger amount thereof is likely to partially remain in the cured product, thus decreasing the water resistance, hence undesirable. A preferred amount of the curing catalyst is 0.1 to 10 parts by weight, and a more preferred one is 1 to 5 parts by weight.

The curable composition of the present invention may contain the above-mentioned compound capable of forming a keto-enol tautomer, preferably an ester of acetoacetic acid, β-diketone or like compounds to improve the storage stability.

The resin composition and the curable composition of the invention are usable for a wide range of applications according to a specific purpose of use. For example, these compositions can be used as a composition containing such composition as the chief vehicle component, or as a curing agent for curing other resins such as hydroxyl- or carboxyl-containing resins or the like.

According to the invention, a coating composition comprising as an essential component the above resin composition or the above curable composition can be provided.

When required, the coating composition of the invention may incorporate a low-molecular weight compound of up to 2,000 in number average molecular weight which contains at least two epoxy groups per molecule. Such low-molecular weight compound acts as a reactive diluent. When mixed with the coating composition, the compound can lower the viscosity of the composition, thus increasing the solids content thereof. Further the composition forms small quantities of by-products during curing. Therefore, there can be provided a high solid coating composition which is uniformly curable and excellent in other properties. Moreover, the resulting coat is less susceptible to shrinkage during curing and outstanding in surface smoothness.

Useful compounds having at least two epoxy groups per molecule and a number average molecular weight of up to 2000 include the compounds represented by the formulas

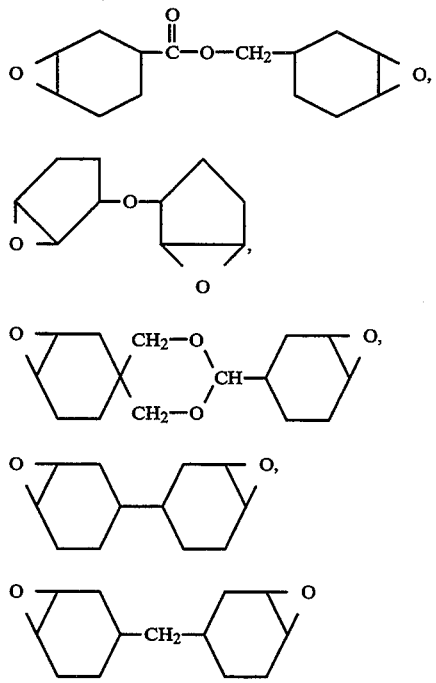

and the like; an adduct of a compound

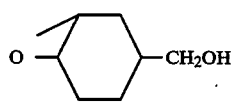

with such a polyisocyanate compound as organic diisocyanates including hexamethylene diisocyanate, trimethylhexamethylene diisocyanate or like aliphatic diisocyanates, xylylene diisocyanate, isophorone diisocyanate or like cyclic aliphatic diisocyanates, tolylene diisocyanate, 4,4'-diphenylmethane diisocyanate or like aromatic diisocyanates; an adduct of such organic diisocyanante with a polyhydric alcohol, low-molecular weight polyester, water or the like; a polymer of such organic diisocyanates; and isocyanate-biurets, etc. Representative commercial products of these compounds are those available under the trademarks: "BURNOCK D-750, -800, DN-950, DN-970 and 15-455" (products of Dainippon Ink And Chemicals Incorporated), "DESMODUL L, NHL, IL, and N3390 (products of Bayer AG, West Germany), "TAKE-NATE D-102, -202, -110N and -123N" (products of Takeda Chemical Industries, Ltd.), "CORONATE-L, -HL, -EH and -203" (products of Nippon Polyurethane Kogyo K. K.), "DURANATE 24A-90CX" (product of Asahi Chemical Industry Co., Ltd.), etc. Also among useful low-molecular weight compounds are an adduct of a compound of the formula

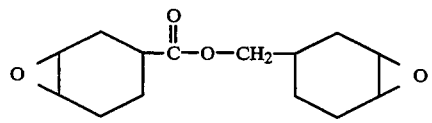

with a polybasic acid; and a compound obtainable by oxidizing an ester containing unsaturated group such as

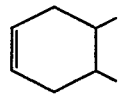

(e.g. esters of 900 in number average molecular weight obtainable by esterifying tetrahydrophthalic anhydride, trimethylolpropane, 1,4-butanediol and the like) with a peracetic acid or the like.

In addition to the above compounds containing alicyclic epoxy groups, also usable are compounds having epoxy group other than alicyclic epoxy group, such as diglycidyl ether, 2-glycidylphenyl glycidyl ether etc.

It is important that the low-molecular weight compound having at least two epoxy groups per molecule have a number average molecular weight of less than 2,000. The compounds of more than 2000 in number average molecular weight have a low compatibility with the base resin used, consequently failing to give a coat excellent in finishing properties and film properties.

A suitable amount of the low-molecular weight compound is 0 to about 100 parts by weight, preferably about 10 to about 60 parts by weight, per 100 parts by weight of the non-volatile content of the resin composition.

When required, the coating composition of the invention may further contain for example an epoxy-containing resin or a hydroxyl-containing resin such as a styrene-allyl alcohol copolymer. The amount of such resin is up to about 10% by weight, based on the non-volatile content of the resin composition.

The coating composition of the invention as mixed with known additives selected as required are usable as a topcoating composition and/or intercoating composition for coating automotive body panels.

When the coating composition of the invention is used as a topcoating composition, for example as a solid-color coating composition, a clear topcoating composition in the two-coat one-bake coating method or a clear topcoating composition in the three-coat two-bake coating method, suitable proportions of the components are about 100 parts by weight of the resin composition, about 0.1 to about 30 parts by weight of a metal chelate compound and 0 to about 100 parts by weight of a coloring pigment, calculated as solids. Useful coloring pigments can be an inorganic or organic coloring pigment of high weatherability conventionally-used in topcoating compositions for coating automotive body panels. Among useful coloring pigments are inorganic pigments such as rutile-type titanium oxide, carbon black and the like and organic pigments such as quinacridone red pigment or like quinacridone-type pigments, pigment red and like azo-type pigments, phthalocyanine blue, phthalocyanine green and like phthalocyanine pigments, etc. When used as a clear coating composition in the two-coat one-bake coating method, the coating composition of the invention is used without a coloring pigment.

When the coating composition of the invention is used as a base coating composition in the two-coat one-bake method or as a metallic coating composition in the one-coat one-bake coating method, suitable proportions of the components are about 100 parts by weight of the resin composition, about 0.1 to about 30 parts by weight of a metal chelate compound, about 2 to about 36 parts by weight of a metallic pigment and 0 to about 40 parts by weight of a coloring pigment, calculated as solids. Useful metallic pigments can be conventional ones including flaky metallic powders such as powders of aluminum, copper, micaceous iron oxide, bronze, stainless steel or the like. The coloring pigment for use herein can be any of those exemplified hereinbefore. Further, the coating composition may contain up to about 20 parts by weight of a modified resin for rheology control useful for improving the metallic effect by adjusting the arrangement of metallic pigment, examples of the resin being cellulose acetate butyrate, an acrylic dispersion containing the core crosslinked resin obtained by conventional heterogeneous polymerization, or the like.

For use as an intercoating composition for coating automotive body panels, suitable proportions of the components in the coating composition of the invention are about 100 parts by weight of the resin composition, about 0.1 to about 30 parts by weight of a metal chelate compound, about 5 to about 150 parts by weight of a pigment and 0 to about 100 parts by weight of a low-molecular weight compound containing at least two epoxy groups per molecule, calculated as solids. Useful pigments are titanium oxide, barium sulfate, calcium carbonate, clay and like inorganic pigments and organic pigments for coloration.

The coating composition of the invention can be applied as by electrostatic coating (bell type, REA type or the like), air spraying or other coating-methods, using conventional coaters or coating equipment conventionally employed. Before use, the coating composition of the invention is adjusted to a suitable viscosity of about 15 to about 35 seconds (Ford cup No. 4, at 20° C.) for application of intercoat, or about 12 to about 30 seconds (Ford cup No. 4, at 20° C.) for application of topcoating. The viscosity of the composition is suitably variable depending on the coater, the kind of the solvent, coating conditions and the like.

The solvent for diluting the coating composition can be any of those for conventional coating compositions of the acrylic resin/melamine resin type. Specific examples of such solvent are toluene, xylene and like hydrocarbon solvents; methyl ethyl ketone, methyl isobutyl ketone and like ketone solvents; ethyl acetate, butyl acetate and like ester solvents; dioxane, ethylene glycol diethyl ether and like ether solvents; and butanol, propanol and like alcohol solvents. While these solvents may be used alone or in a suitable combination, alcohol solvents are preferably used in mixture with other solvents in view of solubility of the resin. To enhance the curing rate, an organic solvent having a boiling point of about 150° C. or below is preferred to which, however, useful solvents are not limited in the invention.

The coating composition of the invention is useful as an intercoating composition and/or a topcoating composition for example in a coating method comprising electrophoretically applying a primer to a steel panel treated by chemical conversion, and coating the steel panel with an intercoating composition (optionally omissible) and a topcoating composition, or a coating method comprising applying to a plastics substrate a primer suitable for a plastics material, drying the coat, and applying an intercoating composition (optionally omissible) and a topcoating composition in this sequence.

In formation of intercoat, the coating composition of the invention is applied to a dry film thickness of about 25 to about 60 μm. In formation of topcoat, the coating composition of the invention is applied to a dry film thickness of about 20 to about 60 μm, preferably about 30 to about 40 μm when used as a solid-color coating composition in the one-coat one-bake coating-method, a metallic coating composition in the one-coat one-bake method, a clear topcoating composition in the two-coat one-bake method or a clear topcoating composition in the three-coat two-bake method. The coating composition of the invention is applied to a dry film thickness of about 10 to about 25 μm, preferably about 10 to about 20 μm when used as a metallic base coating composition in the two-coat one-bake coating method.

Presumably the curable composition of the invention is readily curable by crosslinking at low temperatures in the presence of a small quantity of water for the following reason. In the first-step reaction, the silane groups present in the resin composition are hydrolyzed in the presence of water using a metal chelate compound as a catalyst, giving silanol groups. In the second-step reaction, crosslinking is caused by dehydration condensation of silanol groups or by the formation of bonds of the formula

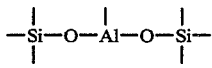

due to the reaction of the silanol groups with a metal chelate compound. In the third-step reaction, bonds of the following formula

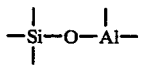

are coordinated with other silanol groups to polarize the silanol groups which cause the epoxy groups to undergo ring opening polymerization, thereby inducing crosslinking.

The conventional curable compositions heretofore known are cured on crosslinking caused by the second-step reaction. In contrast, the curable composition of the invention is properly cured by crosslinking at low temperatures in the presence of a small quantity of water presumably because the presence of the epoxy group allows the second- and the third-step reactions to occur concurrently like a chain reaction.

The fluorine component present in the curable composition of the invention is poor in compatibility with the silane-containing components and epoxy-containing components, and is unlikely to inhibit the reaction between silane and epoxy groups, hence exhibiting a high curability. Further, the fluorine atoms chemically attached to the cured product are chemically stable to extraneous attack as by light, heat, water, acids or the like, and moreover serve to give a cured product low in surface energy.

Effects of the Invention

The coating composition of the invention used as a topcoating composition for coating an automotive body panel can achieve the following remarkable results.

(1) The coating composition of the invention gives a coat excellent in surface smoothness and distinctness-of-image gloss. The ionic polymerization reaction and addition reaction predominantly constitute the curing reaction of the composition and only a significantly small amount of by-products are formed. Therefore the composition undergoes a low degree of volumetric shrinkage during curing and can form a coat having a surface without fine irregularities, hence excellent in distinctness-of-image gloss.

(2) The composition of the invention is of the one-package type and has an excellent low temperature curability.

The composition of the invention is satisfactorily crosslinkable when baked at about 80° C. for 30 to 40 minutes.

(3) The composition of the invention which is of the one-package type is stable as a coating material and low in toxicity.

(4) The coat formed from the composition of the invention is excellent in acid resistance.

The coat formed from the composition has chemically stable C-F bonds and the crosslinked portions are highly resistant to acids, so that the coat is significantly excellent in acid resistance. Therefore the coat formed is completely free of stain, loss of gloss and etching caused by acid rain or the like.

(5) The coat formed from the composition of the invention has an excellent resistance to staining.

The coat is highly resistant to pollutants due to various factors including a high density of crosslinking and a high water repellency due to the polysiloxane bond and the fluorine component.

(6) The coat formed from the composition of the invention is outstanding in water repellency.

Because of the polysiloxane bonds and the fluorine component present in the base resin, the coat has a high hydrophobicity and a good water repellency. In particular, the fluorine component present at the side chain of the base resin reduces the surface energy of the coat, thereby providing the coat with a high water repellency over an automotive body panel.

(7) The coat of the compositions of the invention is outstanding in resistance to scratching.

The coat has a high resistance to scratching because of the synergistic effect produced by a high density of crosslinking, and the reduction of frictional resistance attributable to polysiloxane and C—F bonds present in the base resin.

(8) The coat of the composition of the invention has a high resistance to weather (namely free of loss of gloss, cracking, chalking, blistering and the like).

The coat is cured with little difference in degree of curing in the surface and the interior of the coat, leaving substantially no portion uncured. This phenonmenon is due to various factors including small amounts of by-products produced during curing-and concurrently occurring crosslinking reaction such as the ion polymerization reaction of epoxy groups, the reaction for adducting epoxy groups to silanol and hydroxyl groups and the condensation reaction of silanol groups. In addition, the coat contains C—F bonds excellent in chemical stability. Consequently the coat thus uniformly cured exhibits excellent resistance to weather.

EXAMPLES

The present invention will be described below in greater detail with reference to Preparation Examples and Examples.

Preparation Examples of copolymers useful in the invention are given below.

Preparation Example 1 (Preparation of Copolymer 1)

A 400 ml-vol. autoclave of stainless steel equipped with a stirrer was charged with the following monomers:

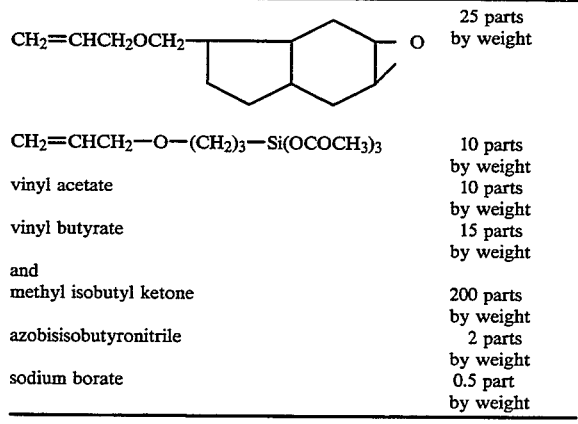

| | |
|---|---|
| CH$_2$=CHCH$_2$—O—(CH$_2$)$_3$—Si(OCOCH$_3$)$_3$ | 10 parts by weight |
| vinyl acetate | 10 parts by weight |
| vinyl butyrate | 15 parts by weight |
| and | |
| methyl isobutyl ketone | 200 parts by weight |
| azobisisobutyronitrile | 2 parts by weight |
| sodium borate | 0.5 part by weight |

After nitrogen replacement, solidification by cooling and deaeration, 40 part by weight of CF$_2$=CFCl was placed into the autoclave wherein the temperature was gradually elevated to 60° C. The mixture was reacted with stirring for 16 hours or longer. When the internal pressure of the autoclave was reduced to 1 kg/cm$^2$ or lower, the autoclave was cooled with water to terminate the reaction. The obtained resin solution was added to an excess of heptane to precipitate the resin. The precipitate was washed and dried to give 85 g of resin in a yield of 85%. The obtained resin had a number-average molecular weight of 6,200 as determined by gel permeation chromatography. The resin was dissolved in an equal amount of xylene, giving a resin solution having a nonvolatile content of 50% by weight.

Preparation Examples 2 to 5 (Preparation of Copolymers 2 to 5)

Copolymers 2 to 5 were prepared using the monomers shown below in Table 1 in the proportions listed therein in the same manner as Preparation Example 1. Table 1 also shows the number average molecular weight of the obtained copolymers.

Preparation Example 6 (Preparation of Copolymer 6)

A 400 ml-vol. glass flask equipped with a stirrer was charged with the following components.

| Solution of Copolymer 4 (nonvolatile content 50 wt. %) | 200 parts by weight |
|---|---|
| $(CH_3O)_3SiC_3H_6NCO$ | 35 parts by weight |
| Xylene | 35 parts by weight |

The mixture was subjected to an addition reaction of —OH and —NCO groups at 90° C. for 5 hours with stirring to give a solution of Copolymer 6.

From the disappearance of absorption of —OH group at 3530 cm$^{-1}$ in infrared absorption spectrum, it was confirmed that —Si(OCH$_3$)$_3$ group was introduced into Copolymer 4.

Preparation Example 7 (Preparation of Copolymer 7)

A solution of Copolymer 7 was prepared in the same manner as in Preparation Example 6 by reacting the following components.

| Solution of Copolymer 5 (nonvolatile content 50 wt. %) | 200 parts by weight |
|---|---|
| $(CH_3O)_3SiC_3H_6NCO$ | 27 parts by weight |

TABLE 1

| | Copolymer No. | | | | |
|---|---|---|---|---|---|
| | 1 | 2 | 3 | 4 | 5 |
| | Amount of Monomer (part by wt.) | | | | |
| $CH_2=CHO(CH_2)_4OH$ | | | | 20 | 15 |
| $CH_2=CHOCH_2$—(cyclohexyl)—O | | | 35 | 20 | |
| $CH_2=CHCH_2OCH_2$—(bicyclic)—O | 25 | | | | |
| $CH_2=CH-Si(OH)(OCH_3)_2$ | | 20 | | | |
| $CH_2=CHCH_2O(CH_2)_3-Si(OCOCH_3)_3$ | 10 | | | | |
| $CH_2=CH-O$—(cyclohexyl) | | 10 | 20 | 5 | 30 |
| $CH_2=CH-O-C_2H_5$ | | | 15 | 5 | 5 |
| $CH_2=CHOC(=O)CH_3$ | | 10 | | | |
| $CH_2=CHOCC_3H_7(=O)$ | 15 | | | | |
| $CF_2=CFCl$ | 40 | 45 | 45 | 50 | 50 |
| $CF_2=CF_2$ | | 10 | | | |
| Number Average Molecular Wt. | 6200 | 6800 | 4200 | 6500 | 5000 |

Preparation Examples 8 to 13, 19 and 20 (Preparation of Copolymers 8 to 13, 19 and 20)

Fluorine-containing acrylic copolymer varnishes were prepared using the monomers given below in Table 2 in the indicated proportions by a usual method for synthesis of acrylic copolymer varnish.

The obtained varnishes were solutions of xylene having a nonvolatile content of 50% by weight.

Table 2 shows the number average molecular weight of the copolymers as determined by gel permeation chromatography.

The macromonomer B used for preparation of Copolymer 10 was prepared as follows.

Synthesis Example of Macromonomer B

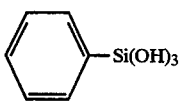

| | |
|---|---|
| Phenyltrisilanol (50 mol) | 7800 g |
| $CH_2=CHCOOC_3H_6Si(OCH_3)_3$ γ-Acryloxypropyltrisilanol (1 mol) | 200 g |
| Toluene | 4500 g |

The above mixture was reacted at 117° C. for 3 hours. The obtained polysiloxane macromonomer had a number-average molecular weight of 7,000 and contained one vinyl group and 5 to 10 hydroxyl groups on the average per molecule.

The amount of the macromonomer B shown in Table 2 is the quantity of the active ingredients as the macromonomer.

Preparation Example 14 (Preparation of Copolymer 14)

A solution of Copolymer 14 was prepared in the same manner as Preparation Example 6 by reacting the following components.

| | |
|---|---|
| Copolymer 11 (nonvolatile content 50 wt. %) | 200 parts by weight |
| (structure shown) | 31 parts by weight |
| Xylene | 31 parts by weight |

Preparation Example 15 (Preparation of Copolymer 15)

A solution of Copolymer 15 was prepared in the same manner as Preparation Example 6 by reacting the following components,

TABLE 2

| | Copolymer No. | | | | | |
|---|---|---|---|---|---|---|
| | 8 | 9 | 10 | 11 | 19 | 20 |
| | Amount of Monomer (part by wt.) | | | | | |
| $CH_2=CHOO(CH_2)_2OH$ | | | | 10 | | 10 |
| $CH_2=C(CH_3)-COOCH_2$-(cyclohexane-O) | | 55 | | | 20 | 20 |
| $CH_2=C(CH_3)-COO-CH_2-CH-CH_2$ (epoxide) | 40 | | | | | |
| Macromonomer B | | | 30 | | | |
| $CH_2=C(CH_3)-COOC_3H_6-Si(OCH_3)_3$ | 15 | | | | 10 | 10 |
| $CH_2=CH-C_6H_4-C_3H_6-Si(CH_3)_2-ON(CH_3)_2$ | | | 20 | | | |
| Styrene | 10 | 15 | 10 | 15 | 30 | 20 |
| n-Butyl methacrylate | 25 | 10 | 50 | 45 | 30 | 30 |
| $CH_2=CHCOOC_2H_4C_8F_{17}$ | 10 | 20 | 10 | 10 | 10 | 10 |
| Number-average Molecular Wt. | 9500 | 5000 | 5500 | 5000 | 6000 | 6000 |

| | Copolymer No. | | | |
|---|---|---|---|---|
| | 12 | 13 | 17 | 18 |
| | Amount of Monomer (part by wt). | | | |
| $CH_2=CHCOO(CH_2)_2OH$ | 15 | | | |
| $CH_2=C(CH_3)COOC_2H_4NCO$ | | 10 | | |
| $CH_2=CHCOOC_2H_4OCONH$-(phenyl)-$NHCOCH_2$-(cyclohexane-O) | | | 60 | |
| $CH_2=CH-COOC_3H_6-Si[ON(CH_3)_2]_3$ | | | 25 | |
| $CH_2=CHCOOCH_3H_6-Si[N(CH_3)_2]_3$ | | | | 25 |
| Styrene | 20 | 10 | 20 | 30 |
| n-Butyl methacrylate | 55 | 40 | 20 | 45 |
| $CH_2=CHCOOC_2H_4C_8F_{17}$ | | 15 | | |
| $CH_2=C(CH_3)COOC_2H_4C_8F_{17}$ | 10 | | | |
| Number-average Molecular Wt. | 5000 | 5800 | 6500 | 7200 |

| | |
|---|---|
| Copolymer 12 (nonvolatile content 50 wt. %) | 200 parts by weight |
| 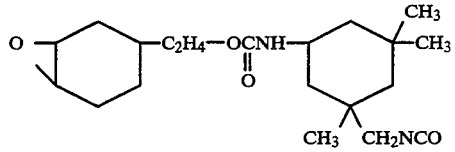 | 47 parts by weight |
| Xylene | 47 parts by weight |

Preparation Example 16 (Preparation of Copolymer 16)

A solution of Copolymer 16 was prepared in the same manner as Preparation Example 6 by reacting the following components,

| | |
|---|---|
| Copolymer 13 (nonvolatile content 50 wt. %) | 200 parts by weight |
| 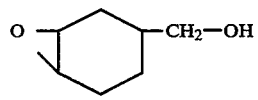 | 8 parts by weight |
| Xylene | 8 parts by weight |

Preparation Examples 17 and 18 (Preparation of Copolymers 17 and 18)

The varnishes of acrylic copolymers 17 and 18 shown in Table 2 were prepared by a usual method for synthesizing acrylic copolymer varnish, The obtained vanishes were solutions of xylene having a nonvolatile content of 50% by weight, Table 2 shows the number-average molecular weight of the copolymers as determined by gel permeation chromatography.

Preparation of Base Coating Composition A

A base coating composition to be applied in combination with a clear coat composition in the two-coat one-bake method was prepared as follows.

Preparation of Polysiloxane Macromonomer

| | |
|---|---|
| Methyltrimethoxysilane | 2720 g (20 mol) |
| γ-Methacryloxypropyl-trimethoxysilane | 256 g (1 mol) |
| Deionized water | 1134 g |
| 36 wt. % Hydrochloric acid | 2 g |
| Hydroquinone | 1 g |

The above mixture was reacted at 80° C. for 5 hours. The obtained polysiloxane macromonomer had a number-average molecular weight of 2,000 and one vinyl group (polymerizable unsaturated bond) and 4 hydroxyl groups, on the average per molecule.

A copolymer was prepared using the obtained macromonomer.

| | |
|---|---|
| Polysiloxane macromonomer | 150 g |
| 2-Hydroxy ethylacrylate | 100 g |
| 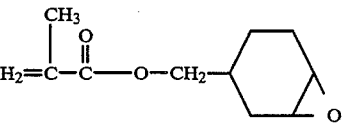 | 150 g |
| n-Butyl acrylate | 500 g |
| Styrene | 100 g |
| Azobisisobutyronitrile | 10 g |

The above mixture was added dropwise to 1,000 g of a 1:1 (w/w) mixture of butanol and xylene and the mixture was polymerized at 120° C. to give a transparent copolymer. The obtained copolymer had a number-average molecular weight of about 30,000.

Using the obtained copolymer, a metallic base coating composition A of the following components useful in the two-coat one-bake method was prepared from the components in the amounts listed below (calculated as solids).

| | |
|---|---|
| Above copolymer | 95 parts by weight |
| Cellulose acetate butyrate | 5 parts by weight |
| Aluminum paste #55-519 (product of Toyo Aluminum Co., Ltd.) | 13 parts by weight |
| Tris(acetylacetonato)aluminum | 1 part by weight |

The above mixture was adjusted to a viscosity of 3 seconds (Ford Cup No. 4, 20° C.) with a 80/20 mixture of toluene/Swasol #1500 (tradename, Cosmo Oil Co., Ltd.) and applied.

Preparation of Topcoating Composition

Using the copolymers obtained in Preparation Examples described hereinbefore, automotive topcoating compositions were prepared. The obtained topcoating compositions were solid color ones (white) and clear ones useful in the two-coat one-bake method.

Table 3 below shows preparation examples of solid color (white) compositions (S-1 to S-9, S-12 and S-13). Titanium oxide was dispersed in a copolymer solution for 1 hour using a paint shaker. The pigment was used in an amount of 80 parts by weight per 100 parts by weight of the resin calculated as solids.

Table 4 below shows preparation examples of clear coating compositions (Nos. M-1 to M-18) useful in the two-coat one-bake method. The values in tables mean the same as those of solid color compositions.

The amounts of copolymers and oligomer shown in the tables are expressed in parts by weight of active ingredients.

TABLE 3

(Preparation of Coating Compositions)

| Coating composition No. | S-1 | S-2 | S-3 | S-4 | S-5 | S-12 | S-13 |
|---|---|---|---|---|---|---|---|
| Copolymer 1 | 70 | | | | | | |
| Copolymer 2 | | | | 30 | 40 | | |
| Copolymer 3 | | | | 50 | | | |
| Copolymer 6 | | 70 | | | | | |
| Copolymer 8 | | | 70 | | | | |
| Copolymer 17 | | | | | 30 | | |
| Copolymer 19 | | | | | | 70 | |
| Copolymer 20 | | | | | | | 70 |
| Chelate compound | | | | | | | |
| Tris(acetylacetonato)-aluminum | 1 | | 1 | | 1 | 1 | 1 |
| Tetrakis(acetylacetonato)-zirconium | | 1 | | | | | |

TABLE 3-continued (Preparation of Coating Compositions)

| | | | | | | | | |
|---|---|---|---|---|---|---|---|---|
| Diisopropoxy-bis(ethyl-acetoacetate)titanate | | | | | 1 | | | |
| Oligomer A* | 30 | 30 | 30 | 30 | 20 | 30 | 30 | |
| Titanium White** | 80 | 80 | 80 | 80 | 80 | 80 | 80 | |

| Coating composition No. | S-6 | S-7 | S-8 | S-9 |
|---|---|---|---|---|
| Copolymer 3 | | 40 | | 50 |
| Copolymer 7 | 40 | | | |
| Copolymer 9 | | | 60 | |
| Copolymer 10 | | 40 | 20 | |
| Copolymer 15 | 40 | | | |
| Copolymer 18 | | | | 30 |
| Chelate compound Tris(acetylacetonato)-aluminum | 1 | 1 | 1 | 1 |
| Oligomer A* | 20 | 20 | 20 | 20 |
| Titanium White** | 80 | 80 | 80 | 80 |

TABLE 4

(Preparation of Coating Compositions)

| | Coating composition No. | | | | |
|---|---|---|---|---|---|
| | M-1 | M-2 | M-3 | M-4 | M-5 |
| Copolymer 1 | 70 | | | | |
| Copolymer 2 | | | | 50 | |
| Copolymer 3 | | | | | 50 |
| Copolymer 8 | | 70 | | | |
| Copolymer 14 | | | 70 | | |
| Copolymer 16 | | | | | 70 |
| Chelate compound | | | | | |
| Tris(acetylacetonato)-aluminum | 1 | 1 | | 1 | 1 |
| Tetrakis(acetylacetonato)-zirconium | | | 1 | | |
| Oligomer A* | 30 | 30 | 30 | 30 | 0 |

| | Coating composition No. | | | | |
|---|---|---|---|---|---|
| | M-6 | M-7 | M-8 | M-9 | M-10 |
| Copolymer 2 | 50 | 40 | 40 | | |
| Copolymer 3 | | | | 50 | |
| Copolymer 7 | | | 20 | | 40 |
| Copolymer 9 | 20 | | | | |
| Copolymer 15 | | 40 | | | 40 |
| Copolymer 17 | | | 40 | | |
| Chelate compound | | | | | |
| Tris(acetylacetonato)-aluminum | | | 1 | 1 | 1 |
| Tris(ethylacetoacetate)-aluminum | 1 | | | | |
| Diisopropoxy-bis(ethyl-acetoacetate)titanate | | 1 | | | |
| Oligomer A* | 30 | 20 | 20 | 30 | 20 |

| | Coating composition No. | | | |
|---|---|---|---|---|
| | M-11 | M-12 | M-13 | M-14 |
| Copolymer 3 | 40 | | | 50 |
| Copolymer 7 | | | | |
| Copolymer 9 | | 30 | | |
| Copolymer 10 | 40 | 50 | 50 | |
| Copolymer 17 | | | 30 | |
| Copolymer 18 | | | | 30 |

TABLE 4-continued (Preparation of Coating Compositions)

| | | | | |
|---|---|---|---|---|
| Chelate compound Tris(acetylacetonato)-aluminum | 1 | 1 | 1 | 1 |
| Oligomer A* | 20 | 20 | 20 | 20 |

| | Coating composition No. | | | |
|---|---|---|---|---|
| | M-15 | M-16 | M-17 | M-18 |
| Copolymer 3 | 40 | | | |
| Copolymer 7 | | 25 | | |
| Copolymer 9 | 20 | | | |
| Copolymer 10 | | 25 | | |
| Copolymer 17 | | | | |
| Copolymer 18 | | | | |
| Copolymer 19 | | | 70 | |
| Copolymer 20 | | | | 70 |
| Chelate compound Tris(acetylacetonato)-aluminum | 1 | 1 | 1 | 1 |
| Oligomer A* | 10 | 50 | 30 | 30 |
| Phenyltriethoxysilane | 30 | | | |

Oligomer A*: Alicyclic oxirane group-containing compound represented by the formula

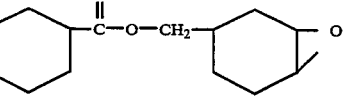

Titanium white**: "Titanium oxide JR-602", trademark for product of Teikoku Kako Co., Ltd.

Coating film performance tests I

To a dull-finished steel panel treated by chemical conversion was applied an epoxy resin-type cationic electrodeposition coating composition to a film thickness of about 25μm and cured with heating at 170° C. for 30 minutes. Lugabake AM as an intercoating composition (tradename for an automotive polyester resin/melamine resin coating composition manufactured by Kansai Paint Co., Ltd.) was applied to the panel to a dry film thickness of about 30 μm and the coated panel was baked at 140° C. for 30 minutes. The coating surface was subjected to wet-grinding with #400 sandpaper, dried and wiped with a piece of cloth saturated with petroleum benzine to give a substrate specimen.

The solid color topcoating compositions (S-1 to S-9, S-12 and S-13) prepared in Examples were adjusted to a viscosity of 22 seconds (Ford Cup No.4, 20 ° C.) with Swasol #1000 (trademark for a product of Cosmo Oil Co., Ltd., petroleum type solvent). The diluted composition was applied to the substrate specimen to a dry film thickness of 40 to 50 μm, set at room temperature for 10 minutes and baked at 140° C. for 30 minutes to give a test coated panel.

Lugabake AM white (coating composition No. S-10) was applied in the same manner as above to give a test coated panel for comparison.

Table 5 shows the test results.

TABLE 5

| | Composition of the invention | | | | | | | | | | | Comparative composition |
|---|---|---|---|---|---|---|---|---|---|---|---|---|
| Coating comp. used | S-1 | S-2 | S-3 | S-4 | S-5 | S-6 | S-7 | S-8 | S-9 | S-12 | S-13 | S-10 |
| Curing temp.(°C.) | 140 | 140 | 140 | 140 | 140 | 140 | 140 | 140 | 140 | 140 | 140 | 140 |
| Gloss | 90 | 88 | 91 | 90 | 93 | 91 | 94 | 95 | 94 | 90 | 90 | 92 |
| Hardness*1 | 2H | H | H | H | F | B | H | H | H | H | 3H | H |
| Distinctness-of-image gloss*2 | 86 | 87 | 86 | 89 | 85 | 89 | 90 | 87 | 88 | 88 | 88 | 84 |
| Xylol resistance*3 | A | A | B | A | B | A | A | A | A | B | A | B |
| Adhesion*4 | 100/100 | 100/100 | 100/100 | 100/100 | 100/100 | 100/100 | 100/100 | 100/100 | 100/100 | 100/100 | 100/100 | 100/100 |
| Impact resistance*5 | 30 | 30 | 30 | 35 | 30 | 30 | 30 | 25 | 30 | 30 | 40 | 25 |

TABLE 5-continued

| Coating comp. used | Composition of the invention | | | | | | | | | | | Comparative composition |
|---|---|---|---|---|---|---|---|---|---|---|---|---|
| | S-1 | S-2 | S-3 | S-4 | S-5 | S-6 | S-7 | S-8 | S-9 | S-12 | S-13 | S-10 |
| Acid resistance*6 | A | A | A | A | B | B | A | B | A | A | A | E |
| Scratching resistance*7 | B | B | B | B | A | B | B | B | B | B | A | D |
| Water resistance*8 | A | A | A | A | A | A | A | A | A | A | A | A |
| Staining resistance*9 | A | B | B | A | B | B | A | B | B | A | A | D |
| Water repellency*10 | 83 | 82 | 90 | 83 | 81 | 89 | 93 | 96 | 81 | 84 | 84 | 79 |
| Weatherability*11 | A | A | A | A | B | A | A | B | A | A | A | Chalking |
| Storage stability*12 | A | A | A | A | A | A | A | A | A | A | A | A |

Coating film performance tests II

A substrate of polypropylene resin was coated with Soflex No. 2500 (trademark for a product of Kansai Paint Co., Ltd.), a primer, to a dry film thickness of 15 to 20 μm and athe coated substrate was baked at 80° C. for 20 minutes to give a substrate specimen.

The solid color topcoating compositions (S-1 and S-7) were applied to the substrate specimen and abaked at 80° C. for 30 minutes. For comparison, Retan PG-80 white (trademark for a product of Kansai Paint Co., Ltd., coating composition No. S-11) was employed as a solid color topcoating composition.

Table 6 shows the test results.

TABLE 6

| Coating comp. used | Composition of the invention | | Comparative composition |
|---|---|---|---|
| | S-1 | S-7 | S-11 |
| Gloss | 88 | 93 | 89 |
| Hardness*1 | F | F | F |
| Distinctness-of-image gloss*2 | 87 | 89 | 85 |
| Xylol resistance*3 | B | B | B |
| Adhesion*4 | 100/100 | 100/100 | 100/100 |
| Impact resistance*5 | 35 | 30 | 30 |
| Acid resistance*6 | A | A | A |
| Scratching resistance*7 | B | B | D |
| Water resistance*8 | A | A | A |
| Staining resistance*9 | B | B | C |
| Water repellency*10 | 82 | 94 | 76 |
| Weatherability*11 | A | A | A |
| Storage stability*12 | A | A | C |

Coating film performance tests III

The base coating composition A was applied to the substrate specimen (treated in the same manner as in performance test I) to a dry film thickness of 15 to 20 μm and was left to stand for about 5 minutes. Clear topcoating compositions (Nos. M-1 to M-18) diluted with Swasol #1000 to a viscosity of 22 seconds were applied to the coated specimens to a dry film thickness of 35 to 45 μm. After application of the topcoating compositions, the coated substrates were allowed to stand at room temperature for about 10 minutes and baked at 100° C. or 140° C. for 30 minutes.

To substrate specimen were also applied Magicron #1000 (silver) as a base coating composition and Magicron #1000 (clear) as a clear topcoating composition (product of Kansai Paint Co., Ltd., acryl/melamine resin-type coating composition, No. M-19). The coated substrate was baked at 140° C. for 30 minutes.

Table 7 shows the test results.

TABLE 7

| | Composition of the invention | | | | | | | | | |
|---|---|---|---|---|---|---|---|---|---|---|
| Coating comp. used | M-1 | | M-2 | | M-3 | | M-4 | | M-5 | |
| Curing temp.(°C.) | 100 | 140 | 100 | 140 | 100 | 140 | 100 | 140 | 100 | 140 |
| Gloss | 91 | 93 | 92 | 93 | 92 | 94 | 93 | 93 | 91 | 91 |
| Hardness*1 | F | H | F | F | F | F | F | H | F | H |
| Distinctness-of-image gloss*2 | 85 | 86 | 84 | 86 | 85 | 85 | 84 | 86 | 89 | 89 |
| Xylol resistance*3 | B | A | B | B | B | A | A | A | B | A |
| Adhesion*4 | 100/100 | 100/100 | 100/100 | 100/100 | 100/100 | 100/100 | 100/100 | 100/100 | 100/100 | 100/100 |
| Impact resistance*5 | 30 | 30 | 35 | 30 | 30 | 30 | 30 | 30 | 35 | 30 |
| Acid resistance*6 | A | A | A | A | A | A | A | A | B | A |
| Scratching resistance*7 | B | B | B | B | B | B | B | B | B | B |
| Water resistance*8 | A | A | A | A | A | A | A | A | A | A |
| Staining resistance*9 | B | A | B | B | B | B | B | B | B | B |
| Water repellency*10 | 82 | 83 | 88 | 89 | 88 | 89 | 93 | 92 | 84 | 82 |
| Weatherability*11 | A | A | B | A | B | A | B | A | A | A |
| Storage stability*12 | A | | A | | A | | A | | A | |
| Coating comp. used | M-6 | | M-7 | | M-8 | | M-9 | | M-10 | |
| Curing temp.(°C.) | 100 | 140 | 100 | 140 | 100 | 140 | 100 | 140 | 100 | 140 |
| Gloss | 92 | 92 | 94 | 93 | 96 | 96 | 89 | 88 | 90 | 91 |
| Hardness*1 | F | H | F | H | F | 2H | F | H | F | H |
| Distinctness-of-image gloss*2 | 85 | 86 | 86 | 85 | 86 | 87 | 90 | 91 | 88 | 87 |
| Xylol resistance*3 | A | A | B | A | B | A | B | A | B | A |
| Adhesion*4 | 100/100 | 100/100 | 100/100 | 100/100 | 100/100 | 100/100 | 100/100 | 100/100 | 100/100 | 100/100 |
| Impact resistance*5 | 30 | 30 | 30 | 30 | 30 | 25 | 30 | 30 | 30 | 30 |
| Acid resistance*6 | A | A | A | A | A | A | A | A | A | A |
| Scratching resistance*7 | B | A | B | A | B | A | B | A | B | B |
| Water resistance*8 | A | A | A | A | A | A | A | A | A | A |
| Staining resistance*9 | B | B | B | A | B | B | B | B | B | B |

TABLE 7-continued

| Composition of the invention | | | | | | | | | | |
|---|---|---|---|---|---|---|---|---|---|---|
| Water repellency*10 | 85 | 86 | 91 | 93 | 82 | 81 | 81 | 83 | 87 | 89 |
| Weatherability*11 | A | A | A | A | B | A | A | A | A | A |
| Storage stability*12 | A | | A | | A | | A | | A | |
| Coating comp. used | M-11 | | M-12 | | M-13 | | M-14 | | M-15 | |
| Curing temp.(°C.) | 100 | 140 | 100 | 140 | 100 | 140 | 100 | 140 | 100 | 140 |
| Gloss | 92 | 93 | 94 | 94 | 94 | 96 | 90 | 93 | 93 | 94 |
| Hardness*1 | F | H | F | H | F | H | H | H | F | 2H |
| Distinctness-of-image gloss*2 | 91 | 89 | 88 | 90 | 87 | 87 | 86 | 85 | 89 | 90 |
| Xylol resistance*3 | B | A | B | A | B | A | B | A | B | A |
| Adhesion*4 | 100/100 | 100/100 | 100/100 | 100/100 | 100/100 | 100/100 | 100/100 | 100/100 | 100/100 | 100/100 |
| Impact resistance*5 | 30 | 30 | 30 | 30 | 30 | 30 | 35 | 30 | 30 | 25 |
| Acid resistance*6 | A | A | B | A | B | A | A | A | B | A |
| Scratching resistance*7 | B | A | B | B | B | A | B | B | B | A |
| Water resistance*8 | B | B | A | A | A | A | A | A | A | A |
| Staining resistance*9 | B | A | B | A | B | B | B | B | B | B |
| Water repellency*10 | 93 | 93 | 96 | 95 | 90 | 92 | 81 | 82 | 91 | 89 |
| Weatherability*11 | A | A | B | B | B | A | A | A | B | A |
| Storage stability*12 | A | | A | | A | | A | | A | |

| | | | | | | | Comparative composition |
|---|---|---|---|---|---|---|---|
| Coating comp. used | M-16 | | M-17 | | M-18 | | M-19 |
| Curing temp.(°C.) | 100 | 140 | 100 | 140 | 100 | 140 | 140 |
| Gloss | 90 | 91 | 91 | 92 | 92 | 95 | 93 |
| Hardness*1 | F | 2H | F | H | 2H | 3H | F |
| Distinctness-of-image gloss*2 | 90 | 91 | 85 | 87 | 86 | 87 | 75 |
| Xylol resistance*3 | B | A | B | B | A | A | B |
| Adhesion*4 | 100/100 | 100/100 | 100/100 | 100/100 | 100/100 | 100/100 | 100/100 |
| impact resistance*5 | 30 | 25 | 25 | 30 | 35 | 40 | 20 |
| Acid resistance*6 | B | A | B | A | A | A | E |
| Scratching resistance*7 | B | A | B | B | A | A | D |
| Water resistance*8 | A | A | A | A | A | A | A |
| Staining resistance*9 | B | B | B | A | A | A | C |
| Water repellency*10 | 86 | 87 | 82 | 84 | 82 | 84 | 76 |
| Weatherability*11 | B | A | A | A | A | A | C (Cracking) |
| Storage stability*12 | A | | A | | A | | A |

*1Pencil hardness:
The coating surface was scratched with a pencil "Mitsubishi Uni" (tradename for pecils manufactured by Mitsubishi Pencil Co., Ltd.) while being pressed with the pencil lead. The degree of pencil hardness was evaluated and expressed in usual symbols for hardness such as H, 2H or B to represent a maximum hardness of lead which caused no mar on the surface.

*2Distinctness-of-image gloss
The distinctness-of-image gloss was determined using an image clarity meter (product of Suga Tester Co., Ltd.). The figures in tables are those expressed in values of 0 to 100% as ICM value determined by the meter. The larger the value, the higher the distinctness-of-image gloss. The values of more than 80 indicate markedly high distinctness-of-image gloss.

*3Xylol resistance
The coating surface was vigorously rubbed with a piece of xylol-impregnated gauze pressed with fingers to achieve 10 reciprocal strokes. The results were evaluated in terms of the degrees of dissolution, mar and swelling and rated according to the following criteria.
A: Not changed in appearance properties
B: Gloss slightly lost
C: Gloss lost
D: Swollen
E: Dissolved

*4Adhesion
Scores reaching the substrate were made across the coated surface in a crisscross pattern of 100 meshes 1 mm square each. Then, a cellophane tape was applied to the surface and, then, quickly peeled off. The surface condition was evaluated and the result was expressed in the number of meshes remaining unpeeled divided by 100.

*5Impact resistance
The impact resistance was determined using a Du Pont impact tester (diameter of impact load element ½ inch: weight 0.5 kg). The degrees of impact resistance were assessed in terms of a maximum height at which the dropping of the weight caused no cracking on the coating surface.

*6Acid resistance
The coated substrate specimen was immersed in 40% $H_2SO_4$ at 40° C. for 5 hours, withdrawn and washed with water after which the degree of acid resistance was evaluated according to the criteria in which the symbols A to E designate the highest to lowest degrees of acid resistance (e.g. the symbol A means the appearance without change and the symbol E indicates a change as in loss of gloss, errosion and the like).

*7Scratching resistance
The scratching resistance was detemined using a tester for color fastness of dyed materials against friction (product of Daiei Kagakuseiki Seisakusho). A polishing powder ("Daruma Cleanser", trademark) was kneaded with water to give a mass of high viscosity and the resulting mass was placed on the coating surface. While being pressed with a terminal element of the tester, the coating surface was rubbed with the mass deposited theron under a load of 0.5 kg to achieve 25 reciprocating strokes. After the coated substrate was washed with water, the degree of scratching was evaluated according to the following ratings:
A: Not scratched
B: Slightly scratched
C: Scratched in low degree

TABLE 7-continued

Composition of the invention

D: Scratched in high degree
E: Scratched in highest degree
*8Water resistance
The coated substrate specimen was immersed in a thermostatic water bath at 40° C. for 240 hours. After withdrawal, the water resistance of the coating surface was evaluated in scales of 5 grades represented by symbols A to E in which the symbol A means the appearance without change as in gloss or blistering.
*9Staining resistance
A 1 g quantity of stained dust according to JIS No.15 was placed onto the coated substrate specimen measuring 5 × 5 cm. The dust was uniformly spread over the substrate with 20 strokes of a brush and was left to stand at 20° C. for 24 hours. The coated substrate specimen was washed in running water with a clean brush and checked for the degree of staining. The results were evaluated according to the following ratings.
A: Not stained
B: Slightly stained
C: Stained in unacceptable degree
D: Stained in highest degree
*10Water repellency
The water repellency was expressed in terms of the angle at which the coating surface is in contact with water.
The contact angle was measured with a contact angle meter (product of Kyowa Science Co., Ltd.) 3 minutes after dropping 0.03 ml of distilled water onto the coating surface at a temperature of 20° C. The greater the figure, the higher the water repellency.
*11Weatherability
Using an accelerated weathering tester (manufactured by Q Panel Co., Ltd.), a QUV acceleratd exposure test was carried out under the following conditions:
One cycle: UV irradiation    16 hr/60° C.
                             Water condensation 8 hr/50° C.
After conducting 125 cycles of operation (3000 hours), the degree of weatherability was evaluated according to the following ratings.
A: Retaining substantially the same gloss as in initial stage
B: Slightly impaired in gloss, but flawless in cracking, blushing and the like
C: Significantly reduced in gloss and defective in cracking and chalking
*12Storage stability
The coating composition diluted to a constant viscosity (22 seconds/Ford Cup No.4) was placed into a container
The container was covered with a lid to prevent exposure to the atmosphere and was stored at 40° C. for 1 week. The storage stability was rated according to the following criteria.
A: Increased in viscosity to up to 5 seconds
B: Increased in viscosity to 5 to 10 seconds
C: Gelled

*1 Pencil hardness

The coating surface was scratched with a pencil "Mitsubishi Uni" (tradename for pecils manufactured by Mitsubishi Pencil Co., Ltd.) while being pressed with the pencil lead. The degree of pencil hardness was evaluated and expressed in usual symbols for hardness such as H, 2H or B to represent a maximum hardness of lead which caused no mar on the surface.

*2 Distinctness-of-image gloss

The distinctness-of-image gloss was determined using an image clarity meter (product of Suga Tester Co., Ltd.). The figures in tables are those expressed in values of 0 to 100% as ICM value determined by the meter. The larger the value, the higher the distinctness-of-image gloss. The values of more than 80 indicate markedly high distinctness-of-image gloss.

*3 Xylol resistance

The coating surface was vigorously rubbed with a piece of xylol-impregnated gauze pressed with fingers to achieve 10 reciprocal strokes. The results were evaluated in terms of the degrees of dissolution, mar and swelling and rated according to the following criteria.
A: Not changed in appearance properties
B: Gloss slightly lost
C: Gloss lost
D: Swollen
E: Dissolved

*4 Adhesion

Scores reaching the substrate were made across the coated surface in a crisscross pattern of 100 meshes 1 mm square each. Then, a cellophane tape was applied to the surface and, then, quickly peeled off. The surface condition was evaluated and the result was expressed in the number of meshes remaining unpeeled divided by 100.

*5 Impact resistance

The impact resistance was determined using a Du Pont impact tester (diameter of impact load element ½ inch; weight 0.5 kg). The degrees of impact resistance were assessed in terms of a maximum height at which the dropping of the weight caused no cracking on the coating surface.

*6 Acid resistance

The coated substrate specimen was immersed in 40% $H_2SO_4$ at 40° C. for 5 hours, withdrawn and washed with water after which the degree of acid resistance was evaluated according to the criteria in which the symbols A to E designate the highest to lowest degrees of acid resistance (e.g. the symbol A means the appearance without change and the symbol E indicates a change as in loss of gloss, errosion and the like).

*7 Scratching resistance

The scratching resistance was determined using a tester for color fastness of dyed materials against friction (product of Daiei Kagakuseiki Seisakusho). A polishing powder ("Daruma Cleanser", trademark) was kneaded with water to give a mass of high viscosity and the resulting mass was placed on the coating surface. While being pressed with a terminal element of the tester, the coating surface was rubbed with the mass deposited thereon under a load of 0.5 kg to achieve 25 reciprocating strokes. After the coated substrate was washed with water, the degree of scratching was evaluated according to the following ratings:

A: Not scratched
B: Slightly scratched
C: Scratched in low degree
D: Scratched in high degree
E: Scratched in highest degree

*8 Water resistance

The coated substrate specimen was immersed in a thermostatic water bath at 40° C. for 240 hours. After withdrawal, the water resistance of the coating surface was evaluated in scales of 5 grades represented by symbols A to E in which the symbol A means the appearance without change as in gloss or blistering.

*9 Staining resistance

A 1 g quantity of stained dust according to JIS No.15 was placed onto the coated substrate specimen measuring 5×5 cm. The dust was uniformly spread over the substrate with 20 strokes of a brush and was left to stand at 20° C for 24 hours. The coated substrate specimen was washed in running water with a clean brush and checked for the degree of staining. The results were evaluated according to the following ratings.

A: Not stained
B: Slightly stained
C: Stained in unacceptable degree
D: Stained in highest degree

*10 Water repellency

The water repellency was expressed in terms of the angle at which the coating surface is in contact with water. The contact angle was measured with a contact angle meter (product of Kyowa Science Co., Ltd.) 3 minutes after dropping 0.03 ml of distilled water onto the coating surface at a temperature of 20° C. The greater the figure, the higher the water repellency.

*11) Weatherability

Using an accelerated weathering tester (manufactured by Q Panel Co., Ltd.), a QUV acceleratd exposure test was carried out under the following conditions:

One cycle: UV irradiation 16 hr/60° C. Water condensation 8 hr/50° C. After conducting 125 cycles of operation (3000 hours), the degree of weatherability was evaluate according to the following ratings.

A: Retaining substantially the same gloss as in initial stage
B: Slightly impaired in gloss, but flawless in cracking, blushing and the like
C: Significantly reduced in gloss and defective in cracking and chalking

*12 Storage stability

The coating composition diluted to a constant viscosity (22 seconds/Ford Cup No.4) was placed into a container. The container was covered with a lid to prevent exposure to the atmosphere and was stored at 40° C. for 1 week. The storage stability was rated according to the following criteria.

A: Increased in viscosity to up to 5 seconds
B: Increased in viscosity to 5 to 10 seconds
C: Gelled

We claim:

1. A fluorine-containing resin composition comprising:
   (a) a fluorine-containing resin having (i) a hydrolyzable group attached directly to a silicon atom and/or a silanol group and (ii) an epoxy group in the molecule, or
   (b) a mixture of a component (I) having a hydrolyzable group attached directly to a silicon atom and/or a silanol group and a component (II) having an epoxy group, wherein at least one of the components (I) and (II) are a fluorine-containing resin, and
   (c) at least one metal chelate compound selected from the group consisting of aluminum chelate compounds which contain as a ligand a compound capable of forming a keto-enol tautomer.

2. A fluorine-containing resin composition which comprises:
   a) a fluorine-containing resin having a hydrolyzable group attached directly to a silicon atom and/or a silanol group, and an epoxy group, or
   b) a mixture of a fluorine-containing resin having hydrolyzable group attached directly to a silicon atom and/or a silanol group with a fluorine-containing resin having an epoxy group, or
   c) a mixture of a fluorine-containing resin having hydrolyzable group attached directly to a silicon atom and/or a silanol group with a fluorine-free resin or compound having an epoxy group, or
   d) a mixture of a fluorine-containing resin having an epoxy group with a fluorine-free resin or compound having a hydrolyzable group attached directly to a silicon atom and/or a silanol group;
   and further comprising at least one metal chelate compound selected from the group consisting of aluminum chelate compounds which contain as a ligand a compound capable of forming a keto-enol tautomer.

3. A fluorine-containing resin composition which comprises:
   (1) a reaction product (D) prepared by reacting a fluorine-containing resin (A) having a functional group, a compound (B) having an epoxy group and a functional group complementarily reactive with said functional group of the compound (A), and a compound (C) having a silane group and a functional group complementarily reactive with said functional group of the compound (A); or
   (2) a mixture (I) of a product (F) and a product (H), said product (F) being a reaction product of a resin (E) having a functional group and the compound (B) having an epoxy group and functional group complementarily reactive with said functional group of said resin (E), and said product (H) being a reaction product of a resin (G) having a functional group and said compound (C) having a silane group and a functional group complementarily reactive with said functional group of the resin (G), at least one of said products (F) and (H) being a fluorine-containing resin;
   (3) a copolymer (L) comprising as a monomer component an epoxy-containing polymerizable unsaturated monomer (J), a silane-containing polymerizable unsaturated monomer (K), a fluorine-containing polymerizable unsaturated monomer (b) and, when required, another polymerizable unsaturated monomer (M); or (4) a mixture of a polymer (N) and a polymer (P), said polymer (N) being a homopolymer of the monomer (J) or a copolymer of the monomer (J) and another polymerizable unsaturated monomer (M), and said polymer (P) being a homopolymer of said monomer (K) or a copolymer of said monomer (K) and said polymerizable unsaturated monomer (M), at least one of said polymer (N) and (P) being a fluorine-containing polymer;

(5) a reaction product (T) of a copolymer (R) with a compound (S), said copolymer (R) comprising, as a monomer component, at least one of a polymerizable unsaturated monomer (Q) having a functional group, said epoxy-containing polymerizable unsaturated monomer (J) and said fluorine-containing polymerizable unsaturated monomer (b), and said compound (S) having a silane group and a functional group complementarily reactive with the functional group derived from said monomer (Q); or (6) a reaction product (X) of a copolymer (V) with a compound (W), the copolymer (V) comprising, as a monomer component, at least one of a polymerizable unsaturated monomer (U) having a functional group, said silane-containing polymerizable unsaturated monomer (K) and said fluorine-containing polymerizable unsaturated monomer (b), and said compound (W) having an epoxy group and a functional group complementarily reactive with the functional group derived from said monomer (U); or (7) a mixture (Y) of said polymer (N) and said reaction product (H), at least one of said polymer (N) and said reaction product (H) containing fluorine; or (8) a mixture (Z) of said polymer (P) and said reaction product (F), at least one of said polymer (P) and said reaction product (F) containing fluorine; or (9) a mixture of a silane-containing and fluorine-containing resin and a compound having at least 2 epoxy groups, on the average, per molecule; or

(10) a mixture of an epoxy-containing and fluorine-containing resin and a compound having at least 2 silane groups, on the average, per molecule, and further comprising at least one metal chelate compound selected from the group consisting of aluminum chelate compounds which contain as a ligand a compound capable of forming a keto-enol tautomer.

4. A composition according to claim 1 comprising the fluorine-containing polymerizable unsaturated monomer (b) as the monomer component of the fluorine-containing resin in an amount of about 1 to about 70% by weight based on the non-volatile content of said composition.

5. A composition according to claim 4 wherein said monomer (b) is represented by the formula $$CX_2=CX_2$$

wherein the groups X are the same or different and each represent H, Cl, Br, F, an alkyl group or a haloalkyl group with the proviso that at least one fluorine atom is present in the molecule, or represented by the formula $$\begin{array}{c} CH_2=CZ \\ | \\ C=O \\ | \\ O-C_nH_{2n}-R^2 \end{array}$$

wherein Z is a hydrogen atom or a methyl group, $R^2$ is a fluoroalkyl group and n is an integer of 1 to 10.

6. A composition according to claim 1 wherein the fluorine-containing resin has a number average molecular weight of about 1,000 to about 200,000.

7. A coating composition comprising as an essential component the composition of any one of claims 1 and 6.

* * * * *